(12) United States Patent
Geske et al.

(10) Patent No.: US 12,525,870 B2
(45) Date of Patent: Jan. 13, 2026

(54) FAULT CURRENT REDUCTION FOR POWER CONVERTER SYSTEMS

(71) Applicant: GE Energy Power Conversion Technology Limited, Warwickshire (GB)

(72) Inventors: Martin Geske, Berlin (DE); Gregory Reichhold, Berlin (DE)

(73) Assignee: GE Energy Power Conversion Technology Limited, Warwickshire (GB)

( * ) Notice: Subject to any disclaimer, the term of this patent is extended or adjusted under 35 U.S.C. 154(b) by 276 days.

(21) Appl. No.: 17/859,828

(22) Filed: Jul. 7, 2022

(65) Prior Publication Data

US 2023/0010737 A1 Jan. 12, 2023

(30) Foreign Application Priority Data

Jul. 7, 2021 (EP) .................................. 21184214

(51) Int. Cl.
*H02M 1/32* (2007.01)
*H02M 7/483* (2007.01)

(52) U.S. Cl.
CPC .......... *H02M 1/325* (2021.05); *H02M 7/4835* (2021.05)

(58) Field of Classification Search
CPC .................................................. H02M 7/4835
See application file for complete search history.

(56) References Cited

U.S. PATENT DOCUMENTS

| 8,472,153 B1 | 6/2013 | Grbovic |
| 9,742,345 B2 | 8/2017 | Xu et al. |

(Continued)

FOREIGN PATENT DOCUMENTS

| EP | 2597764 B1 | 4/2016 |
| EP | 3694098 A1 | 8/2020 |
| JP | 4877482 B2 | 2/2012 |

OTHER PUBLICATIONS

Q. Ren, F. Xiao, S. Ai and X. Hao, "A manchester code communication protocol suitable for power electronics system," IECON 2017—43rd Annual Conference of the IEEE Industrial Electronics Society, Beijing, China, 2017, pp. 571-576, (Year: 2017).*

(Continued)

*Primary Examiner* — Peter M Novak
(74) *Attorney, Agent, or Firm* — Wood IP, LLC; Theodore A. Wood

(57) ABSTRACT

A power converter system is described. The power converter system includes a power converter comprising at least one converter unit, each converter unit comprising a plurality of semiconductor devices, each semiconductor device including at least a controllable semiconductor switch. A local controller is associated with at least one converter unit and adapted to receive CD and MD from a main controller. In response to a detected fault condition of the power converter system, the local controller is adapted to use at least one of the one or more locally-stored values to determine an operating state of the power converter system, and to use the determined operating state to select a fault operating procedure to control each associated converter unit according to the selected fault operating procedure without using any CD from the main controller.

14 Claims, 9 Drawing Sheets

(56) References Cited

U.S. PATENT DOCUMENTS

2014/0002933 A1 1/2014 Gao et al.
2014/0301400 A1 10/2014 Tatsumi et al.
2019/0335355 A1* 10/2019 Agarwal ........... H04W 28/0289

OTHER PUBLICATIONS

Chenaru et al. "Fault-Tolerant Control System Implementation Based on Parameter Analysis," Studies in Informatics and Control, vol. 25, No. 10, Jun. 2016, pp. 227-236, DOI: 10.24846/v25i2y201610.
Extended European Search Report for European Application No. 21184214.1 dated Dec. 17, 2021, 11 pages.
Mathe et al. "Control of a Modular Multilevel Converter With Reduced Internal Data Exchange," IEEE Transactions on Industrial Informatics, vol. 13, No. 1, Feb. 2017, pp. 248-257, XP011641042, ISSN: 1551-3203, DOI: 10.1109/TII.2016.2598494.
Shunfeng et al. "A novel distributed control strategy for modular multilevel converters," 2017 IEEE Applied Power Electronics Conference and Exposition (APEC), IEEE, Mar. 26, 2017, pp. 3234-3240, XP033098722, DOI: 10.1109/APEC.2017.7931160.

* cited by examiner

FAULT CURRENT REDUCTION FOR POWER CONVERTER SYSTEMS

CROSS-REFERENCE TO RELATED APPLICATIONS

This application claims the benefit of European Patent Application Serial Number 21184214.1, filed Jul. 7, 2021, which is herein incorporated by reference.

TECHNICAL FIELD

The present disclosure relates to power converter systems, and in particular to voltage source converters (VSCs) with at least one converter unit that can be controlled exclusively by a local controller during a fault condition of the power converter system when, for example, the local controller no longer receives control data from a main controller or when the control cycle time is too long for appropriate fault handling. The control carried out exclusively by the local controller during the fault condition can include generating gate drive commands for the semiconductor switches of each associated converter unit according to a fault operating procedure that is selected using one or more values that are stored in the local controller during a normal operating condition of the power converter system.

The VSCs can be modular multi-level converters (MMCs) where a plurality of converter units (or submodules) that are connected together in series to define a converter arm of the MMC. Each converter unit can also be a conventional VSC such as a two-level or multi-level converter with a separate power supply infeed, for example. A plurality of conventional VSCs can be connected together in series.

BACKGROUND

MMCs are well known for various medium- and high-power applications and have been implemented as VSCs for: high voltage direct current (HVDC) transmission systems; variable speed drives (VSDs), e.g., for driving electrical machine and other electrical loads; direct AC/AC power conversion, e.g., for supplying AC power to the overhead line of electric rail networks or industrial equipment, and static synchronous compensators (STATCOMs) for regulating AC transmission networks, for example.

A typical MMC includes at least one converter arm with a plurality of series-connected submodules (sometimes called switching modules) and an inductor. The submodules can have any suitable topology such as half-bridge, full-bridge, cross-connected, mixed-cell etc. as will be known to the skilled person. Each submodule normally has at least two controllable semiconductor switches and an energy storage device (e.g., a capacitor). In some arrangements, the semiconductor switches are connected in series and the energy storage device is connected in parallel with the series-connected semiconductor switches. According to the switching state of each submodule—as determined by the switching state of the individual semiconductor switches—the converter arm current will either charge/discharge the energy storage device or bypass the energy storage device so that its voltage is maintained.

The MMC will typically have a plurality of converter arms arranged in parallel—for example converter arms may be connected in parallel between a pair of DC buses with each converter phase having an upper arm with one or more submodules and a lower arm with one or more submodules and defining an AC bus therebetween, or each converter arm may be connected at one end to a respective AC bus and connected to each other (e.g., in a star or delta configuration) or to another respective AC bus at the other end.

One or more local controllers are normally used to control the switching state of the submodules in a converter arm to carry out current, voltage and voltage balancing control. In particular, the local controllers can typically balance the energy of the energy storage devices by using certain switching states that increase, decrease or maintain the DC voltage of the submodules in order to balance and equalize the charge levels of the submodules in the converter arm. Each submodule can have its own local controller. Or a group of two or more submodules in the converter arm can be controlled together by a local controller. Each local controller can control the switching state of each associated submodule or group of submodules by controlling the switching state of the individual semiconductor switches—i.e., by controlling the individual semiconductor switches to switch to an on- or off-state as required to either charge/discharge the energy storage device or bypass the energy storage device.

Each local controller can use pulse width modulation (PWM) to generate gate drive commands which are supplied to the respective gate drive unit of the semiconductor switches of each associated submodule or group of submodules. (As used herein, the term "gate drive commands" refers to the command signals that are generated or derived by each local controller and applied to each gate drive unit to turn the associated semiconductor switch on or off as appropriate.) Each local controller can generate or derive the gate drive commands according to the desired switching states of each associated submodule or group of submodules. The gate drive commands can be calculated locally by a respective PWM generator in response to a modulation signal. The modulation signal for each submodule can be derived to provide both current, voltage and voltage balancing control.

Each modulation signal is compared with a carrier waveform to derive the gate drive commands in a known manner. Alternatively, nearest level control or sorting-based methods can be used to control the output voltage of the submodules and the whole converter. Each modulation signal can be derived using at least one signal received by each local controller from a main controller, e.g., a controller for the converter arm or the MMC, or each modulation signal can be received directly from the main controller.

The at least one signal can be a current and/or voltage reference signal, for example, which can be used by each local controller to generate the modulation signal. Because an MMC typically includes a plurality of submodules, controlling the MMC using one main controller involves exchanging a large amount of data with the submodules or their local controllers for voltage balancing, protection settings, fault information and the control of the overall converter outputs, for example.

Alternatively, the main controller can transmit to each local controller at least one signal for directly controlling the switching of the semiconductor switches of each associated submodule. The at least one signal can be used by each local controller to derive the gate drive commands. In some arrangements, the at least one signal will contain timing information and switching information (e.g., exact switching time and switch position) that is converted or adapted by each local controller into gate drive commands that are then applied to the gate drive units of each associated submodule. The at least one signal can be transmitted using a suitable protocol, e.g., an ethernet-based protocol. The main controller can internally generate a modulation signal and use PWM to generate the at least one signal with timing and switching information that is transmitted to each local controller.

VSCs are well known and typically comprise at least first and second DC terminals and one or more AC terminals. When operated as an inverter, the VSC can convert a DC input voltage at the DC terminals to an AC output voltage at the AC terminal(s). In practice, the VSC comprises a plurality of controllable semiconductor switches that can be switched between an on-state and an off-state as required to synthesize the AC output voltage. The VSC can be a two-level or multi-level converter, for example. Suitable topologies for a multi-level converter include neutral point piloted (NPP) and neutral point clamped (NPC).

A plurality of known VSCs can be connected together in series—for example, to achieve a specific level of voltage, current or output power.

A common power converter includes a pair of series-connected VSCs where the DC terminals of a first VSC are connected to the DC terminals of a second VSC by means of a DC link that includes at least one energy storage device (e.g., a capacitor). The AC terminal(s) of the first VSC can be connected to a power supply infeed such as a power network or utility grid and the AC terminal(s) of the second VSC can be connected to an electric load such as an electric motor. To supply power from the power supply infeed to the electric load, the first VSC is operated as an active rectifier and the second VSC is operated as an inverter. In some cases, the second VSC can be operated as an active rectifier and the first VSC can be operated as an inverter, e.g., during regenerative braking where power is supplied from an electric motor to the power supply infeed.

Each VSC is typically controlled by a respective local controller which generates or derives the gate drive commands for the semiconductor switches. Each local controller can control the switching state of the associated VSC by controlling the switching state of the individual semiconductor switches. A first local controller can generate gate drive commands for the semiconductor switches of the first VSC and a second local controller can generate gate drive commands for the semiconductor switches of the second VSC.

Each local controller can use PWM to locally generate the gate drive commands which are supplied to the respective gate drive unit of the semiconductor switches of the associated VSC. The gate drive commands can be calculated by a respective PWM generator in response to a modulation signal. Each modulation signal is compared with a carrier waveform to derive the gate drive commands in a known manner. Each modulation signal can be derived using at least one signal received by each local controller from a main controller, e.g., a controller for the power converter, or each modulation signal can be received directly from the main controller. The at least one signal can be a current and/or voltage reference signal, for example, which can be used by each local controller to generate the modulation signal.

Alternatively, the main controller can transmit to each local controller at least one signal for directly controlling the switching of the semiconductor switches of the respective VSC. The at least one signal can be used by each local controller to derive the gate drive commands. In some arrangements, the at least one signal will contain timing information and switching information (e.g., exact switching time and switch position) that is converted or adapted by each local controller into gate drive commands that are then applied to the gate drive units of the respective VSC. The at least one signal can be transmitted using a suitable protocol, e.g., an ethernet-based protocol. The main controller can internally generate a modulation signal and use PWM to generate the at least one signal with timing and switching information that is transmitted to each local controller.

For both types of power converter described above, if there is a fault in the main controller, or in the signal connection (or "communication link") between the main controller and the local controllers, the local controllers will not receive the necessary signal(s) for generating or deriving the gate drive commands. It is therefore known to provide redundancy—e.g., by providing duplicate main controllers and signal connections to try and minimize disruption in the case of a fault condition. But such duplication results in significant costs and increasing complexity. Even if a duplicate main controller is provided, there can often be a delay before it starts to provide one or more signals to the local controllers.

SUMMARY

The present disclosure provides a power converter system comprising a power converter comprising at least one converter unit, each converter unit comprising a plurality of semiconductor devices, each semiconductor device including at least a controllable semiconductor switch (e.g., an IGBT); a main controller; and a local controller associated with at least one converter unit and adapted to receive control data from the main controller and measurement data. The local controller is configured to: during a normal operating condition of the power converter system, control the operation of the power converter using the control data received from the main controller, and regularly store in the local controller a value of the control data and/or measurement data and/or a value derived from the control data and/or measurement data, such that the local controller has one or more locally-stored values. In response to a detected fault condition of the power converter system, uses at least one of the one or more locally-stored values to determine an operating state of the power converter, and uses the determined operating state to select a fault operating procedure to control the power converter according to the selected fault operating procedure without using any control data from the main controller.

Unless otherwise stated, any reference herein to components being "connected" includes both a direct and an indirect electrical connection or coupling, e.g., with the option for components to be electrically connected or coupled together by means of one or more interposing components.

Any reference herein to a "signal" includes a series of discrete values transmitted between components of the power converter system or calculated by a local controller. For example, a signal can provide control data and/or measurement data transmitted as a series of discrete values with a suitable protocol. Any signal can be transmitted using a suitable signal connection.

Each converter unit can be a VSC. Each converter unit can include an energy storage device and is optionally connected to a separate power supply infeed. One or more converter units define the power converter.

The present disclosure further provides a method of operating a power converter system comprising: a power converter comprising at least one converter unit, each converter unit comprising a plurality of semiconductor devices, each semiconductor device including at least a controllable semiconductor switch (e.g., an IGBT); a main controller; and a local controller associated with at least one converter unit. The method comprises, during a normal operating condition of the power converter system, the local controller receiving control data from the main controller and measurement data, the local controller controlling the operation of the power converter using the control data received from the main controller, and the local controller regularly storing in the local controller a value of the control data and/or measurement data and/or a value derived from the control data and/or measurement data, such that the local controller has one or more locally-stored values. In response to a detected fault condition of the power converter system, the local controller uses at least one of the one or more locally-stored values to determine an operating state of the power converter, and users the determined operating state to select a fault operating procedure to control the power converter according to the selected fault operating procedure without using any control data from the main controller.

Normal operation: During a normal operating condition of the power converter system, the local controller will operate in a conventional manner and generate or derive gate drive commands to control the semiconductor switches of each associated converter unit.

The gate drive commands are generated or derived by the local controller using control data provided by the main controller. In particular, the power converter system comprises a main controller that provides control data to the local controller during normal operation of the power converter system. The series of discrete values of the control data can be used directly by the local controller to generate or derive the gate drive commands or can be used to derive or calculate other values, which are used, in turn, to generate the gate drive commands. Measurement data can be provided to the local controller by the main controller or directly from one or more sensors, e.g., current or voltage sensors of the power converter system or a connected load or supply. In some arrangements, the measurement data is also used by the local controller to generate or derive the gate drive commands.

Measurement data can be provided as one or more signals and can include inter alia one or more of Direct current (DC) voltage measurements, including measurements of DC link voltage and/or capacitor voltage measurements (e.g., from one or more submodules); Alternating current (AC) input or output voltage measurements; AC input or output current measurements; converter arm current measurements, which can include one or more AC and/or DC components; frequency and/or angle measurements; phase measurements; rotational speed measurements, e.g., provided by a speed encoder for an electric machine connected to the power converter system; and temperature measurements indicative of the temperature of one or more semiconductor devices or other component of the power converter system.

The control data can be provided as one or more signals that are received by the local controller from the main controller and can include: switching data for controlling the switching of the semiconductor switches of each associated converter unit; modulation data which is used by the local controller to generate gate drive commands; reference data for controlling an electrical parameter (e.g., current or voltage) of the power converter or each associated converter unit and which can be used by the local controller to derive modulation data, which is used, in turn, to generate gate drive commands; switching state of each associated converter unit; status data which is indicative of the operating state of the power converter or each associated converter unit including a fault condition; and any other data for controlling the operation of the power converter or each associated converter unit.

Switching data can be a series of timing values and switching values (e.g., exact switching time and switch position) which are converted or adapted by each local controller to derive the gate drive commands. The switching data can be generated by the main controller in a known manner such as PWM or any other suitable control strategy and then transmitted to the local controller.

Modulation data can be used by the local controller to generate the gate drive commands in a known manner such as PWM or any other suitable control strategy. The modulation data received by the local controller can be modified before it is compared with the carrier waveform to generate the gate drive commands, e.g., for local voltage balancing control which can use measurement data received by the local controller.

Reference data can be used by the local controller to generate gate drive commands. In particular, the reference data can be used along with corresponding measurement data that is received by the local controller to locally derive modulation data which can then be used, in turn, to generate the gate drive commands in a known manner such as PWM or any other suitable control strategy. Reference data can be a series of variable values (e.g., for an AC output) or a series of constant values (e.g., for a DC output) or a series of variable values with overlayed constant values (e.g., for an AC output with DC offset).

Reference data provided by the main controller can include one or more of angle data, frequency data and amplitude data. The reference data can be continuously updated by each local controller if appropriate—it will be appreciated that such updating can be carried out each control cycle of the local controller (or "local control cycle"). In some cases, the period of the local control cycle can be less than about 10 μs and in some cases may even be as small as 1 μs to give an almost analogue control response.

In one arrangement, the modulation data that is received or derived by the local controller is used by a respective PWM generator to generate gate drive commands for the semiconductor switches of each associated converter unit. Gate drive commands are generated for each associated converter unit and put each semiconductor switch in a particular switching state. The switching states of the individual semiconductor switches define a switching state for the converter unit-which in turn defines the output voltage of the individual converter unit.

In one arrangement, the modulation data that is used by each PWM generator to generate the gate drive commands for the associated converter unit can be calculated each local control cycle. In practice, the modulation data is normally a series of voltage values. The modulation data can achieve the required output voltage with the desired current control. The modulation data can also achieve desired voltage balancing of energy storage devices between the associated converter units, e.g., where the local controller receives measurement data from each associated converter unit that is indicative of the measured DC voltage of the converter unit.

The modulation data is used by the respective PWM generator to generate the gate drive commands for the gate drivers of the controllable semiconductor switches. If the local controller is associated with n converter units, the carrier waveforms for the first, second, . . . , nth PWM generator of the local controller are preferably phase-shifted or level-shifted and this is extended to the carrier waveforms for the PMW generators of the remaining local controllers so that all of the carrier waveforms are phase-shifted or level-shifted with respect to each other to generate uniformly distributed switching events for the series-connected converter units of the power converter. Any suitable carrier waveform can be used such as a triangular waveform, sawtooth waveform etc. Two or more carrier waveforms can be used if each converter unit is a multi-level converter in order to generate the various output voltage levels.

During normal operation of the power converter system, the generated gate drive commands will control each associated converter unit to achieve desired electrical parameter values based on the overall operating requirements. But during a fault condition, generated gate drive commands may be used control each associated converter unit according to the selected fault operating procedure—as described in more detail below.

Status data can be any data that relates directly to the operating state of each associated converter unit, the power converter or the power converter system as a whole. The status data can indicate inter alia that the power converter is operably connected to a utility grid or other load, a load status i.e., low-load, high-load etc., that it is being ramped-up, ramped-down, or operating in a steady-state condition, a detected fault condition such as an overcurrent. Status data can be provided to the local controller at regular intervals (e.g., every tenth protocol frame) or when an operating state changes, including when a fault is detected. Other data can also be provided to the local controller for controlling the operation of the power converter or each associated converter unit, including fault thresholds (e.g., time-out or overcurrent thresholds) which can be stored in the local controller and used by the local controller to determine an operating state of the power converter.

Locally-stored fault thresholds can separate normal operation from converter faults and can be used to determine that any operating state changes to a fault condition. For a communication or controller fault, a fault threshold corresponds to a time-out condition that is used to indicate such faults. For a current or overcurrent fault, the fault threshold refers to a specific limit, which can also vary depending on the determined operation state. The fault threshold itself can hold/separate all operating states not falling within specified converter faults.

In one example, the main controller can notify the local controller of "fault ride through" (FRT), where FRT is indicative of a fault in the external utility grid or power network. For such a fault condition, the power converter must normally supply a specific current level that is required by the grid codes. It is likely that overcurrent events will occur. Once the operating condition has been determined, the local controller can control the current below the overcurrent threshold as described below.

The local controller can determine an overcurrent during normal operation, which means the local controller detects an overcurrent and verifies that the corresponding operating state should not trigger overcurrent events. In this case, the fault operating procedure would be to limit and/or reduce the fault current and turn the power converter off. Overcurrent events are not expected during normal operation conditions.

In this regard, the described case could be an overcurrent event triggered by a short-circuit within the power converter, which requires the power converter to be turned off under consideration of a specific turn-off sequence of individual converter units (or submodules) or groups of converter units (or submodules).

In another case, the power converter could be in an overload condition because the utility grid is subjected to undervoltage, which requires the converter current to be increased to compensate or maintain the same output power. In this case it is more likely that overcurrent occurs as compared to normal operating conditions. For the case of an overcurrent detection by the local controller, the local controller can verify the operating state is a power converter overload. The fault operating procedure would be to limit or reduce the fault current but not turn off the power converter. Once the current is limited or has fallen below a certain threshold, which could be a threshold that is less than the fault-indicating threshold, the main controller takes back control of the power converter (i.e., control is based on the control data supplied by the main controller).

Multiple overload conditions can be defined depending on output current and voltage. The local controller can have different thresholds and envelopes to control the current accordingly. The reduction or limitation of the fault current is typically carried out through single converter units, e.g., single submodules of the respective converter arm, which are turned off or inserted with opposing voltage to slightly reduce the arm current. Therefore, submodules that are in a "bypass state" or "zero state" must be switched off or actively inserted through a respective switching state.

As used herein, the bypass state or zero state is a switching state of a particular submodule which creates a current flow through the submodule that does not flow through the energy storage device of the submodule (e.g., a capacitor). A switching state that is used to limit or reduce the fault current corresponds to a current flow through the submodule that passes through the energy storage device in charging direction, which means the energy storage device is charged and the DC voltage of the submodule increases.

In an advantageous arrangement, to reduce the fault current, the local controller inserts and turns off submodules which have lowest charge level (or lowest DC voltage) and are in bypass state of the associated converter arm. If possible, submodules in the charging direction with a high charge level (or high DC voltage) can be immediately bypassed and replaced by another submodule that has lower charge level. To reduce the fault current below a certain threshold (e.g., during FRT), the local controller can autonomously insert submodules with opposing voltage in a sequence, which relates to a direct control of the arm current.

To reduce the fault current initiated through a short circuit, where the operating state is normal, the local controller can use stored delay parameters to perform a specific sequence of turning off the associated submodules. The stored delay parameters are set (and sent) by the main controller. This allows dv/dt to be effectively limited and controlled during a turn-off sequence, which relaxes the requirements for the insulation system of bushings, transformers or related electrical machines etc.

The turn-off sequence can include turning off groups of submodules in a particular sequence, e.g., turning of two submodules about every 5 or 20 μs. The turn-off sequence further mitigates an overvoltage spike that would occur when all submodules (e.g., full-bridge submodules) would be turned off at the same time. This scenario would apply to rapidly diminish a fault current initiated by a short-circuit fault within the power converter. This short-circuit fault current has higher di/dt due to lower impedances in the fault path and requires a turn-off sequence with much shorter delay times compared to other operating conditions such as FRT or overload.

Differentiation between current limitation and current reduction can be defined by several thresholds. For current limitation, submodules are inserted to keep the current below the first overcurrent threshold. For current reduction, one or more additional thresholds are used. Once the first overcurrent threshold is exceeded, the local controller can start to insert submodules as a fault operating procedure to reduce the current below a second threshold that is less than the first overcurrent threshold.

For FRT operation, the fault operation procedure can use a second threshold that is in the range of about 100-300 A below the first threshold. For turning off an overcurrent initiated by a power converter short circuit, the second threshold can be set to about 0 A. When zero current is reached, the fault operating procedure can disconnect the power converter from the utility grid and any load and turns the power converter off.

The local controller can further control the overcurrent through a dedicated local control cycle time that is significantly shorter the control cycle time of the main controller. Accordingly, the local controller can control overcurrent more dynamically with better response time then the main controller. For reducing overcurrent caused through short circuits, the local control cycle time can be about 2-15 μs to consider high di/dt of the arm current. For reducing overcurrent during operational states such as overload and FRT, for example, the local control cycle time can be about 5-25 μs or slightly higher.

Control of fault operating procedures for series-connected converter units or submodules by the local controller can also be carried out using switching states. Switching states can be evaluated under consideration of measured DC voltages by the local controller. The local controller can make an appropriate choice about which of the submodules are optimal to be inserted into the converter arm in the charging direction. Furthermore, multiple switching states of submodules can be combined to discharge submodules with a high DC voltage at the same time, which allows the local controller to use discharged submodules later during the fault operating procedure in charging direction.

A fully turned-off full-bridge submodule would be inserted in the charging direction independent of the direction of the arm current as the diodes would charge the energy storage device (e.g., capacitor) in either direction. A fully turned-off half-bridge submodule would only be inserted in the charging direction for one current direction. Double submodules or combined submodules can have properties as a full-bridge or half-bridge submodule depending on the relevant structure.

Stored values: Each value that is stored in the local controller can be one of the discrete values of the control data and/or measurement data that is received by the local controller and/or a value that is derived or calculated therefrom. For example, if the local controller receives control data in the form of reference data, each value that is stored in the local controller can be a value of the reference data and/or a value of data that is derived from the reference data. For example, each value stored in the local controller may be calculated as the difference between the reference data and corresponding measurement data that might be used as an input to a sub-controller (such as a current controller) for deriving modulation data, or a value of modulation data output by the sub-controller. Other values that are derived or calculated from the control data provided by the main controller can also be stored regularly in the local controller for the purposes of determining the operating state of the power converter.

The control data and/or measurement data provided by the main controller will typically include a series of discrete values that are transmitted to the local controller every control cycle of the main controller (or "main control cycle"). A value can be stored in the local controller for each main control cycle (e.g., about every 40-100 μs) or for multiples of the main control cycle. For other measurement data or stored values that are derived locally by the local controller, a value can be stored for each local control cycle or for multiples of the local control cycle. Not every value of the control data and/or measurement data provided by the main controller, or derived or calculated therefrom, needs to be stored in the local controller as a locally-stored value.

In practice, values only need to be stored sufficiently regularly in the local controller to permit the operating state of the power converter to be determined in the event of a fault condition being detected. The same applies to measurement data that might be provided directly to the local controller from a sensor or other device using a signal connection with a suitable protocol.

The values stored by the local controller can be added to a buffer such as a first in, first out (FIFO) buffer where a certain number of recent values are stored and where these locally-stored values are constantly overwritten as new values are received. In one arrangement, the buffer can store a single value such that only the most recent value is stored. But typically, the buffer can store a plurality of values obtained at different times with the number depending on storage demands etc.

If a plurality of values is stored, one or more of the locally-stored values can be used to determine the operating state of the power converter. In the event of a fault condition which prevents the local controller from receiving control data and/or measurement data from the main controller, the locally-stored values are those that relate to the normal operating condition of the power converter system immediately prior to the fault condition being established.

The locally-stored values are therefore indicative of the most recent normal operating state of the power converter. It is generally preferred that two or more values are stored and used to determine the operating state because they can indicate how the power converter or each associated converter unit was being controlled for a period of time before the fault condition was established. Two or more locally-stored values obtained at different times can indicate if an electrical parameter was being increased, decreased or substantially constant, for example.

The local controller can receive multiple control data for controlling different electrical parameters. For example, the main controller might provide current control data and voltage control data to the local controller for respectively controlling the current and voltage of each associated converter unit. The main controller may also provide current control data and status data for respectively controlling the current of each associated converter unit and indicating an operating status.

If the local controller receives multiple control data, the values can be stored separately and added to separate buffers. For example, if the local controller receives current control data and voltage control data, values of the current control data can be stored in one buffer and values of the voltage control data can be stored in another buffer. This also applies to stored values that are derived or calculated from the multiple control data.

The values are stored within any suitable memory or storage device, e.g., using static random-access memory (SRAM).

Fault condition: During a fault condition of the power converter system, each converter unit of the power converter will normally be controlled exclusively by the associated local controller. In other words, the local controller will control the power converter (e.g., generate gate drive commands for the semiconductor switches of each associated converter unit) without the need for any control data to be provided by the main controller. The local controller will determine an operating state of the power converter using the at least one locally-stored value. If a plurality of locally-stored values are available, two or more locally-stored values can be used to determine the operating state. In general terms, locally-stored data (and optionally measurement data that is obtained during the fault condition) can be analyzed and characterized using well-known mathematical and computational processes to determine the operating state of the power converter.

The local controller can determine an operating state of the power converter using at least one locally-stored value of measurement data. As mentioned above, during normal operating conditions, such measurement data can sometimes be used by the local controller to derive modulation data, e.g., by calculating the difference between measurement data and corresponding reference data to derive an input to a sub-controller that outputs modulation data for generating gate drive commands for each associated converter unit using PWM or other suitable control strategy.

At least one locally-stored value of measurement data (or values derived therefrom) can allow the local controller to determine the actual operating point of each associated converter unit, the power converter or the power converter system as a whole immediately prior to the fault condition, e.g., to determine the rectifier or inverter mode at specific load. If two or more locally-stored values of measurement data were obtained at different times, it is possible to determine changes in the measurement data.

This allows the local controller to determine if the power converter was changing its operating state prior to the fault, or if the power converter was operating in a specific operating state, e.g., start-up or ramp-down for an external load such as an electric machine which might be operating in a motoring or generating mode. In one example, the n most locally-recent stored values can be used to determine if there is an increase in the rate of change of rotational speed or power of the electric machine, which might indicate that the speed or power of the electric machine is increasing, i.e., being ramped-up, and where n might be in the range of 10-25, for example.

At least one locally-stored value of control data (or values derived therefrom) can also allow the local controller to determine the operating state of each associated converter unit, the power converter or the power converter system as a whole. For example, the output voltage and frequency of the respective converter unit can be derived from at least one locally-stored value of modulation data or current reference data. The output voltage and frequency can be used, in turn, to determine the operating state of the converter unit. The output voltage and frequency of the respective converter unit can also be derived from at least one locally-stored value of switching data, e.g., exact switching time and switch position. The output voltage and frequency can be used, in turn, to determine the operating state of the converter unit.

Alternatively, the at least one locally-stored value of switching data can be considered to be a proxy for the operating state of the converter unit and the switching data can be used by the local controller to maintain each converter unit in the same operating state so that it continues to provide the output voltage corresponding to the locally-stored value of switching data for a pre-determined period of time or until control data is received. If two or more locally-stored values of control data were obtained at different times, it is possible to determine changes in the control data. This allows the local controller to determine if the power converter was changing its operating state prior to the fault, or if the power converter was operating in a specific operating state, e.g., start-up or ramp-down for an external load such as a motor or generator.

Status data that is indicative of the operating state of each converter unit, the power converter, or the power converter as a whole, can be used directly by the local controller to determine the operating state such that the control response of the local controller to a detected fault condition is effectively pre-defined by the status data.

Some measurement data may not be affected by the fault condition if the fault is limited to the controller or to the signal connection between the main controller and the local controller. This would include measurement data provided directly to the local controller from one or more sensors, for example. In addition to the one or more locally-stored values, the local controller can use such measurement data obtained during the fault condition to determine the operating state of the power converter.

Once the operating state of the power converter has been determined, it can be used by the local controller to generate gate drive commands for the semiconductor switches of each associated converter unit to control each associated converter unit according to the selected fault operating procedure. The determined operating state can also be used to select a different sort of fault operating procedure—e.g., inserting one or more submodule into a converter arm in a charging direction to reduce a detected overcurrent.

The fault operating procedure may be selected from a plurality of fault operating procedures. The plurality of fault operating procedures can depend on the fault in the power converter system. The plurality of fault operating procedures can depend on whether the power converter is connected to an external electric machine or a utility grid.

The gate drive commands for the selected fault operating procedure may be generated using measurement data that is locally available to the local controller and which is not affected by the fault condition. The gate drive commands may alternatively be generated using control and/or measurement data that is stored during normal operating conditions or derived therefrom.

The gate drive commands can be predefined pulse sequences which can be selected with reference to the determined operating state (e.g., using a look-up table). In other words, the local controller can store a plurality of predefined pulse sequences that can be selected and used depending on the determined operating state of the power converter.

The gate drive commands can be locally generated by the local controller, optionally using previously stored pulse sequence information that can be used to maintain steady-state operation of each associated converter unit during the fault condition. Pulse sequence information can correspond to an optimal voltage output for use during a fault condition.

A fault in the signal connection between the main controller and the local controller, can be detected by the local controller, i.e., the local controller can detect that control data is not being received from the main controller. A fault in the main controller can be detected by an external fault detection process and notified to the local controller by a separate signal connection for fault notification.

Alternatively, the local controller can detect a faulted main controller as a faulted signal connection if no further control data is transmitted by the main controller. In another arrangement, the presence of a fault can be notified to the local controller by the main controller, e.g., by transmitting status data or fault data. If the fault is in the main controller or in the signal connection between the main controller and the local controller, the plurality of fault operating procedures can include inter alia:

- a procedure that turns off each associated converter unit safely (a "shut-down procedure"),
- a procedure that maintains the power converter or each associated converter unit in the determined operating state, i.e., the operating state immediately prior to the fault, or
- a procedure that transitions the power converter or each associated converter unit to a new operating state, optionally preparatory to a shut-down procedure, or
- a procedure that reduces an overcurrent, e.g., by inserting one or more converter units into a converter arm of an MMC or by turning off one or more converter units and placing the remaining converter units in a bypass state or zero state until the overcurrent falls below a threshold. The converter units can be turned off simultaneously or sequentially until a specific number of converter units is turned off.

In a shut-down procedure, each associated converter unit can be turned off safely by switching the semiconductor switches of each associated converter unit to an off-state and maintaining the semiconductor switches in the off-state. This can be done directly by switching all of the semiconductor switches to the off-state or by using a specific turn-off sequence which ends when all of the semiconductor switches have been switched to the off-state.

If the local controller is associated with two or more converter units, or the power converter includes two or more converter units, the shut-down procedure for each converter unit can be staggered by applying an appropriate delay for direct turn-off or by selecting a suitable turn-off sequence. This can prevent high peak voltages that could place undue electrical stress of the insulation system of external components, e.g., an electric machine, transformer etc.

Alternatively, in a shut-down procedure, each associated converter unit can be placed in a specific converter switching state determined by the switching state of the individual semiconductor switches (i.e., where each semiconductor switch is switched to the on-state or the off-state, as appropriate, and maintained in that state). The specific converter switching state can be a "zero state" or one where each converter unit remains electrically connected to a power supply infeed or an electric load without any significant energy exchange, for example.

The fault operating procedure can maintain the power converter or each associated converter unit in the determined operating state of the power converter or each associated converter unit, i.e., the operating state immediately prior to the fault, for a predetermined period of time—for example, as a temporary control measure in case the fault is cleared quickly. Such a fault operating procedure can be used to replicate the normal operating conditions of the power converter system, i.e., where one or more electrical parameters of the power converter or each associated converter unit are maintained as closely as possible to the values of the electrical parameters that existed prior to the fault condition. At the expiry of the predetermined period of time, the local controller can be transitioned to another fault operating procedure if necessary.

The fault operating procedure can transition the power converter or each associated converter unit to a new operating state. In some cases, this can be done before a shut-down procedure where each associated converter unit is turned off or placed in a specific converter switching state (e.g., a zero state or similar). During such a fault operation procedure, one or more electrical parameters (e.g., current, voltage and frequency) of each converter unit are controlled by switching the semiconductor switches of each associated converter unit between an on-state and an off-state.

For example, the fault operating procedure might be a "ramp-down procedure" where one or more of the electrical parameters of the power converter or each associated converter unit are reduced towards zero or a particular value that can keep the power converter system (and any external components such as an electric machine or other electrical load) within a safe operating range or which allows each associated converter unit to be shut down safely using a shut-down procedure.

The fault operating procedure may reduce the frequency and/or current of the power converter or each associated converter unit towards zero at a particular rate. The fault operating procedure might be a "ramp-up procedure" where one or more of the electrical parameters of the power converter or each associated converter unit are increased towards a particular value.

The fault operating procedure may transition the power converter or each associated converter unit to a different operating point.

If the fault is in the main controller, the fault operating procedure can maintain the power converter or each associated converter unit in the determined operating state, i.e., the operating state immediately prior to the fault, or transition the power converter or each associated converter unit to a new operating state (e.g., a ramp-down procedure or ramp-up procedure), and optionally maintain that new operating state, until control data can be provided to the local controller from a redundant main controller.

For example, if it is determined from the at least one locally-stored value, that the power converter or associated converter units were in a ramp-up operating state prior to the fault, the local controller can generate gate drive commands for the semiconductor switches of each associated converter unit to control the power converter or each associated converter unit to continue the ramp-up operating state. Such a redundant main controller can be permanently enabled or can be enabled on detection of a fault condition.

The fault operating procedure can be maintained for a predetermined period of time that is preferably selected to allow the redundant main controller to be properly enabled or, if permanently enabled, to take control of the signal connection and provide control data to the local controller. The fault operating procedure can also be maintained until the redundant main controller is enabled or until the local controller starts to receive control data from the redundant main controller.

In the event that no control data is received after a predetermined period of time (because the redundant main controller is not properly enabled or the fault is more widespread, for example) the local controller can select a different fault operating procedure, e.g., a shut-down procedure or a procedure that transitions the power converter or each associated converter unit to a new operating state.

In the event of a fault in one or more of the converter units, e.g., an overcurrent, short-circuit or flashover in the power converter, the local controller can carry out a trip sequence or generate a sequence of specific gate drive commands to avoid overvoltage or destruction of the semiconductor devices. Such fault detection can be made locally by the local controller, e.g., using local current measurements, or by an external fault detection process which notifies the detected fault to the local controller by a separate signal connection for fault notification.

Fault detection can be notified to the local controller by the main controller as status data. The local controller can place an associated converter unit in a particular converter switching state where the converter unit bypasses the current with respect to the DC link (a bypass state) or can control a converter unit to output an opposing voltage. If the power converter system includes two or more local controllers, each local controller can include delay information to stagger their respective trip sequence and prevent an overvoltage if several converter units insert an opposing voltage at the same time.

If there is a fault in one or more of the converter units associated with the local controller, the local controller can adapt the output voltage. For example, the local controller can independently increase the output voltage for the non-faulty converter units.

If the power converter is connected to an electric machine, specific options for fault operating procedures can include inter alia:

Maintaining rotational speed/torque of the electric machine for a predetermined period of time to see if communication with the main controller is re-established. The gate drive commands can be generated according to a suitable control strategy (e.g., dq axis control in a rotating reference frame) using locally-available speed and/or current data.

Ramp-up or ramp-down electric machine starting from any operating point. The gate drive commands can be generated according to a suitable control strategy (e.g., dq axis control in a rotating reference frame) using locally-available speed and/or current data.

Shut-down of the electric machine. This can be done after ramp-down or if the electric machine is already operating at substantially zero speed.

If the power converter is connected to a utility grid or power network, specific options for fault operating procedures can include inter alia:

Maintaining an electrical connection with the utility grid for a predetermined period of time to see if communication link with the main controller is re-established, with the option to ramp-down power. To stay connected to the utility grid, frequency/angle data should be available. Locally-stored angle data can be rotated to replicate frequency data if frequency data is not directly available. Grid voltage can be measured or derived using locally-stored values. Gate drive commands can be generated so that the converter unit provides a matching AC output voltage with substantially no current flow.

Maintaining power flow to the utility grid for a predetermined period of time to see if communication link with the main controller is re-established. Current and/or power data should also be available in addition to the frequency/angle data-see above. Current and/or power data can be measured or derived using locally-stored values such as current measurement data or reference data from the main controller. Phase data between current and grid voltage should also be available to maintain the same power flow conditions. The gate drive commands can be generated using a suitable current control strategy with amplitude and angle data in a rotating reference frame (e.g., dq axis) or stationary reference frame (e.g., alpha/beta).

Shut-down each associated converter unit after power has been ramped-down.

Semiconductor devices: In each converter unit, each semiconductor device may further include an anti-parallel connected diode, i.e., a diode connected in anti-parallel with its associated controllable semiconductor switch. Controllable semiconductor switches that normally include an anti-parallel connected diode would include insulated-gate bipolar transistors (IGBTs), for example.

Inductor: One or more converter units can be connected in series with at least one inductor.

Modular multi-level converter: The power converter can be a VSC implemented as an MMC with a plurality of series-connected converter units, which are normally called submodules. The plurality of series-connected submodules can define a converter arm of the MMC. The converter arm can also include an inductor. The MMC can include a plurality of converter arms, which can be connected together and/or to any external circuit or load in any suitable arrangement as will be known to the skilled person.

Each submodule can include an energy storage device (e.g., a capacitor). The submodules can be considered to be individual VSCs and can have any suitable topology such as half-bridge, full-bridge, cross-connected, mixed-cell etc. as will be known to the skilled person. Typically, each submodule will include at least two controllable semiconductor switches connected in series and an energy storage device (e.g., a capacitor) connected in parallel with the series-connected semiconductor switches. In a full-bridge topology, each submodule comprises a first leg with two controllable semiconductor switches connected in series and a second leg with two controllable semiconductor switches connected in series.

The first and second legs are connected in parallel between first and second DC rails. An energy storage device (e.g., a capacitor) is connected between the first and second DC rails in parallel with both the first and second legs. If the submodule includes an auxiliary power supply, it can be connected between the first and second DC rails in parallel with the energy storage device and the first and second arms. A junction of the semiconductor switches in the first leg defines a first AC terminal and a junction of the semiconductor switches in the second leg defines a second AC terminal.

The MMC may be utilized for a wide variety of medium- and high-power applications and the converter arms may be configured accordingly for connection to an external power system, including a transmission system or utility grid, and/or to an electrical load if the MMC is configured for power conversion. The converter arms may be connected together, e.g., in a delta or star configuration, if the MMC is configured as a STATCOM. The MMC may have any suitable overall topology. The present disclosure is particularly applicable for MMCs that benefit from rapid current control such as VSCs for: HVDC transmission systems; VSDs, e.g., for driving electrical machine and other electrical loads; direct AC/AC power conversion, e.g., for supplying AC power to the overhead line of electric rail networks or industrial equipment; dynamic static var compensators (DSVCs) for compensation of harmonic generators such as industrial loads; and STATCOMs) for regulating AC transmission or distribution networks, for example.

Voltage source converter: The power converter can be a VSC where each converter unit can be implemented as an individual VSC.

The power converter can include a plurality of series-connected converter units where each converter unit is implemented as an individual VSC.

When implemented as an individual VSC, each converter unit can include a plurality of legs. Each leg can include two or more controllable semiconductor switches and define an AC terminal of the converter unit. Each leg can be connected in parallel between first and second DC rails. The converter units can be two-level or multi-level converters, for example. Suitable topologies for a multi-level converter include NPP and NPC. But it will be readily understood that any suitable topology as will be well known to the skilled person can be used. The leg can also be connected to one or more additional DC rails or terminals.

Each individual VSC can include an energy storage device (e.g., a capacitor) that is charged using an external power source or separate power supply infeed. The energy storage device can be connected between the first and second DC rails in parallel with the plurality of legs. A plurality of energy storage devices can also be connected in series between the first and second DC rails and define one or more additional DC rails or terminals. The energy storage device(s) can be part of a DC link.

A common power converter includes a pair of series-connected VSCs where the DC terminals of a first VSC are connected to the DC terminals of a second VSC by means of a DC link that includes at least one energy storage device (e.g., a capacitor). The AC terminal(s) of the first VSC can be connected to a power supply infeed such as a power network or utility grid and the AC terminal(s) of the second VSC can be connected to an electric load such as an electric motor.

In one arrangement, the power supply infeed can include a separate power converter that is connected to first and second DC rails of the respective VSC. The power converter can be a diode bridge or an active rectifier such as a two-level or multi-level converter, for example. In one arrangement, the AC-side of each power converter can be connected to a respective output winding of a transformer so that the individual VSCs are insulated from each other. In other words, the transformer can have a plurality of output windings that can be inductively coupled to an input winding. The input winding of the transformer can be connected to an external power system. It will be readily understood that other power supply infeed arrangements are possible.

The corresponding submodules of the MMC do not include such a power supply infeed and are therefore often described as being "floating".

A power converter implemented using one or more individual VSCs can be used as a: VSC for HVDC transmission systems, and VSDs, e.g., for driving electrical machine and other electrical loads, for example.

Converter unit connection: As described in more detail below, the one or more converter units (or submodules in the case of an MMC) can be connected in series on the AC-side (i.e., with a series connection between respective AC terminals) or on the DC-side (i.e., with a series connection between respective DC terminals or rails). A series connection on the AC-side can derive an output voltage that includes an AC component and optionally also a DC component.

The converter units (or submodules) can be connected in series on the AC-side. If each converter unit includes a first leg defining a first AC terminal and a second leg defining a second AC terminal, at least one of the first and second AC terminals of each converter unit can be connected to an AC terminal of an adjacent converter unit to define a converter arm.

If the converter arm includes n converter units, the first AC terminal of the first converter unit in the series (i.e., the converter unit at a first end of the converter arm) can be connectable to an AC bus or a DC bus—e.g., forming part of an external power system. The second AC terminal of the nth converter unit in the series (i.e., the converter unit at a second end of the converter arm) can be connectable to an AC bus or a DC bus—e.g., forming part of an external power system—or to another converter arm of the power converter.

For all other converter units (i.e., where n=1, 2, . . . , (n-1)) the second AC terminal of the respective converter unit is connected to the first AC terminal of the next converter unit in the converter arm. That is, the second AC terminal of the first converter unit is connected to the first AC terminal of the second converter unit, the second AC terminal of the second converter unit is connected to the first AC terminal of the third converter unit, the second AC terminal of the third converter unit is connected to the first AC terminal of the fourth converter unit, and so on, until the (n-1)th converter unit.

The converter units can be connected in series on the DC-side. Two converter arms can be connected in series between first and second DC buses (e.g., a positive DC bus and a negative DC bus). The intermediate connection point between the two converter arms can define an AC terminals. If each converter unit includes first and second DC rails defining first and second DC terminals, at least one of the first and second DC terminals of each converter unit can be connected to a DC terminal of an adjacent converter unit.

If the power converter includes n converter units, the first DC terminal of the first converter unit in the series can be connectable to a DC bus—e.g., forming part of an external power system. The second DC terminal of the nth converter unit in the series can be connectable to another DC bus—e.g., forming part of an external power system. For all other converter units (i.e., where n=1, 2, . . . , (n-1)) the second DC terminal of the respective converter unit is connected to the first DC terminal of the next converter unit in the series.

That is, the second DC terminal of the first converter unit is connected to the first DC terminal of the second converter unit, the second DC terminal of the second converter unit is connected to the first DC terminal of the third converter unit, the second DC terminal of the third converter unit is connected to the first DC terminal of the fourth converter unit, and so on, until the (n-1)th converter unit. Each converter leg of each converter unit can define an AC terminal. The AC terminals of the converter units can be connected together or combined on the AC-side, e.g., using a transformer, multi-stage transformer or interface reactors.

Main controller: The main controller can be a controller for the power converter or for the converter arm in the case of an MMC, for example. The main controller can have any suitable implementation.

Local controller: In one arrangement, the local controller can be associated with one converter unit of the power converter.

In another arrangement, the local controller can be associated with two or more converter units of the power converter that can be controlled together as a group.

The power converter system can comprise a plurality of local controllers, each local controller being associated with at least one converter unit and receiving control data from the main controller.

Each local controller can be implemented as a programmable logic device (e.g., a CPLD or FPGA that are semiconductor devices that are based around a matrix of configurable logic blocks). The programmable logic device can support parallel processing to facilitate calculation, sending and receiving of data and the sending of gate drive commands to control the switching of the semiconductor switches of each associated converter unit as parallel processes. Each local controller can also be implemented as DSPs or as micro or multicore processing units, for example.

Each local controller can be implemented as a control device such as a distribution panel or a device with minimal protection and/or measurement functions.

Each local controller can include a suitable memory or storage device, e.g., SRAM.

Signal connection between the local controllers and the main controller:

Each local controller can be connected to the main controller by a suitable signal connection (or "communication link") which allows each local controller to receive control data as one or more signals. The signal connection can also allow other data or information to be transferred between each local controller and the main controller. Any data can be transmitted between the main controller and each local controller using a suitable protocol, e.g., an ethernet-based protocol operating within the control cycle of the main controller.

The signal connection can be a fiber optic cable, an electrical (or wired) connection, or a wireless connection using any suitable wireless protocol, for example.

The signal connection can include two or more fiber optic cables or electrical connections in parallel for redundancy.

DETAILED DESCRIPTION OF THE EMBODIMENTS

Figure 1:
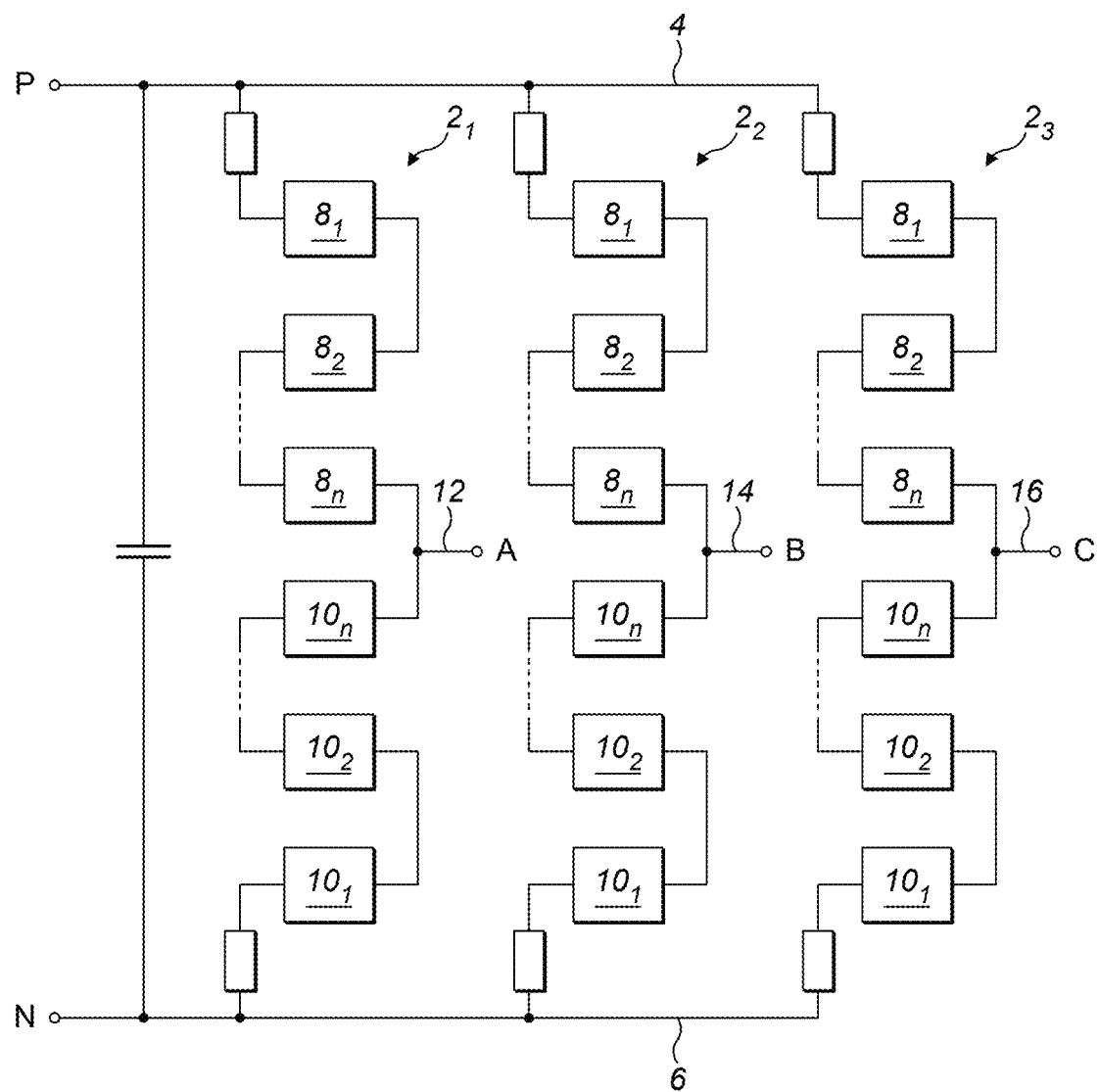
FIG. 1 shows a first power converter according to the present disclosure implemented as a VSD.

FIG. 1 shows a power converter implemented as a VSD. The power converter includes three converter arms $2_1$, $2_2$ and $2_3$ connected in parallel between first and second DC buses 4, 6. Each converter arm is divided into an upper arm and a lower arm. Each upper arm includes n series-connected converter units (or submodules) $8_1$, $8_2$, ..., $8_n$ and each lower arm includes n series-connected converter units (or submodules) $10_1$, $10_2$, ..., $10_n$, where n is any suitable integer. Each converter arm includes an inductor.

The connection between the upper arm and the lower arm of the first converter arm $2_1$ defines a first AC bus 12. The connection between the upper arm and the lower arm of the second converter arm $2_2$ defines a second AC bus 14. The connection between the upper arm and the lower arm of the third converter arm $2_3$ defines a third AC bus 16. The first, second and third AC buses 12, 14 and 16 can be connected to a three-phase AC load or a three-phase AC supply. The first and second DC buses 4 and 6 can be connected to a DC load or a DC supply and can include a DC link with one or more energy storage devices (e.g., capacitors).

The power converter can convert a DC input voltage to an AC output voltage or vice versa by operating the converter units $8_2$, ..., $8_n$ and $10_2$, ..., $10_n$ in a manner well known to the skilled person.

Figure 2:
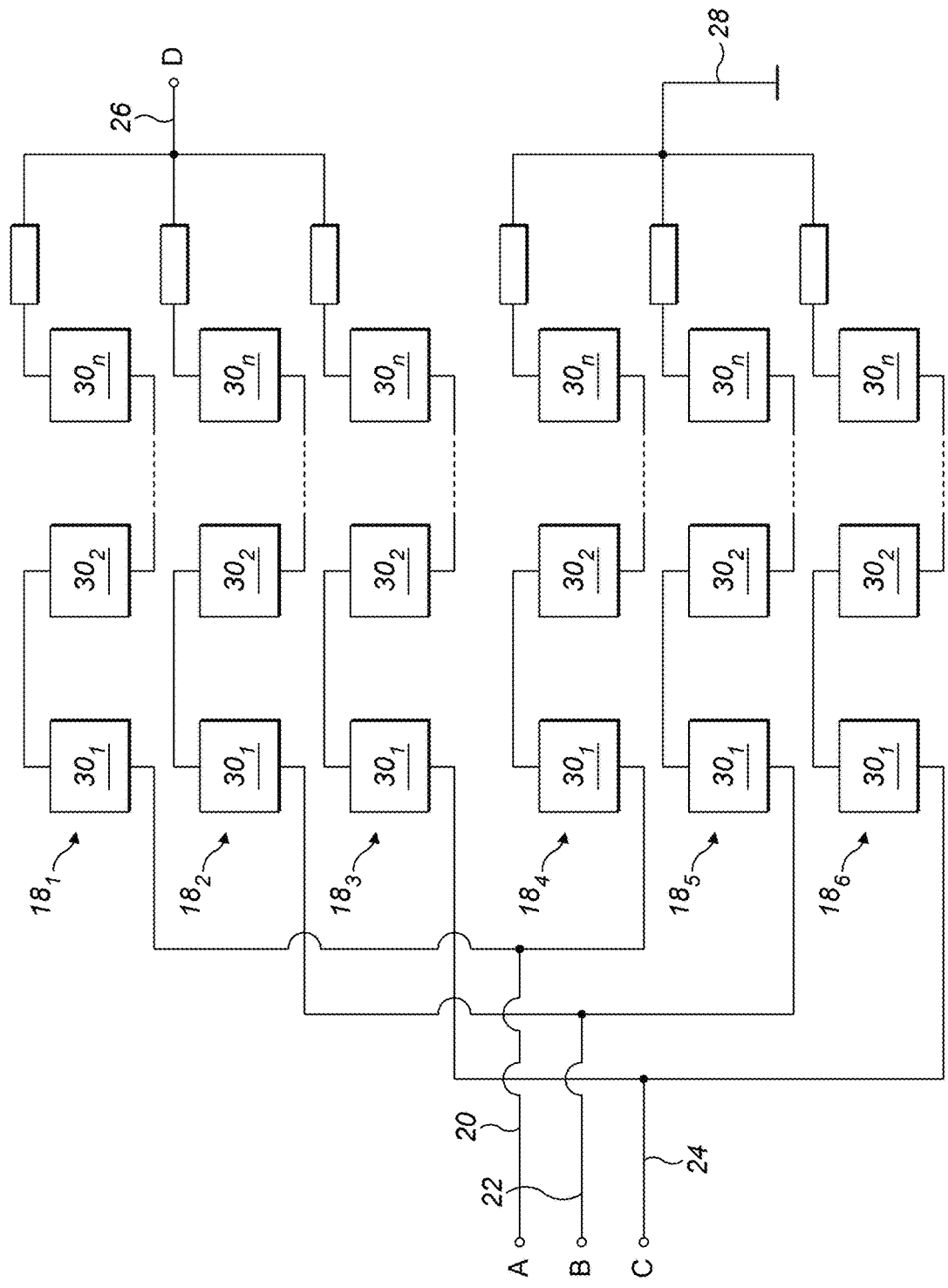
FIG. 2 shows a second power converter according to the present disclosure implemented as an AC/AC converter.

FIG. 2 shows a power converter implemented as an AC/AC converter. The power converter includes six converter arms $18_1$, $18_2$, ..., $18_6$. The first and fourth converter arms $18_1$ and $18_4$ are connected in parallel to a first AC bus 20 at a first end. The second and fifth converter arms $18_2$ and $18_5$ are connected in parallel to a second AC bus 22 at a first end. The third and sixth converter arms $18_3$ and $18_6$ are connected in parallel to a third AC bus 24 at a first end. The first, second and third converter arms $18_1$, $18_2$ and $18_3$ are connected to a fourth AC bus 26 at a second end. The fourth, fifth and sixth converter arms $18_4$, $18_5$ and $18_6$ are connected to ground 28 at a second end.

Each converter arm $18_1$, $18_2$, ..., $18_6$ includes n series-connected converter units (or submodules) $30_1$, $30_2$, ..., $30_n$, where n is any suitable integer. Each converter arm includes an inductor.

The power converter can convert a three-phase AC input voltage to a single-phase AC output voltage at a different frequency by operating the converter units $30_2$, ..., $30_n$. In one example, the power converter can be used to supply AC power from a utility grid operating at 50 Hz to the overhead line of an electric rail network operating at 16.7 Hz.

Figure 3:
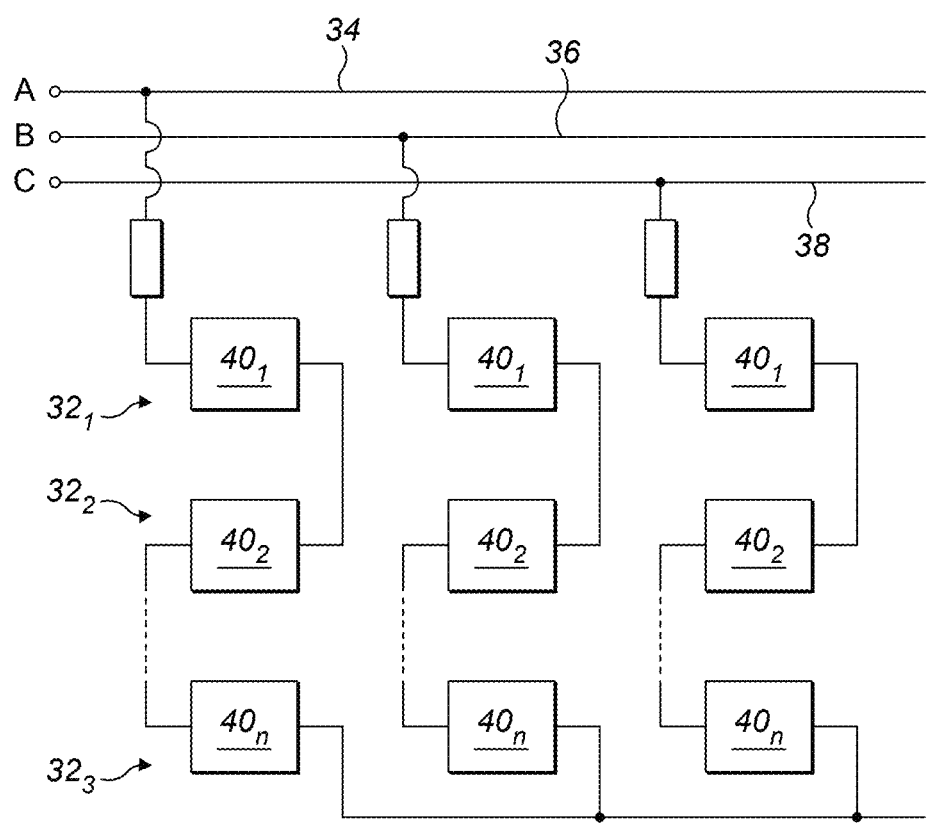
FIGS. 3 and 4 show a third power converter according to the present disclosure implemented as a STATCOM.
Figure 4:
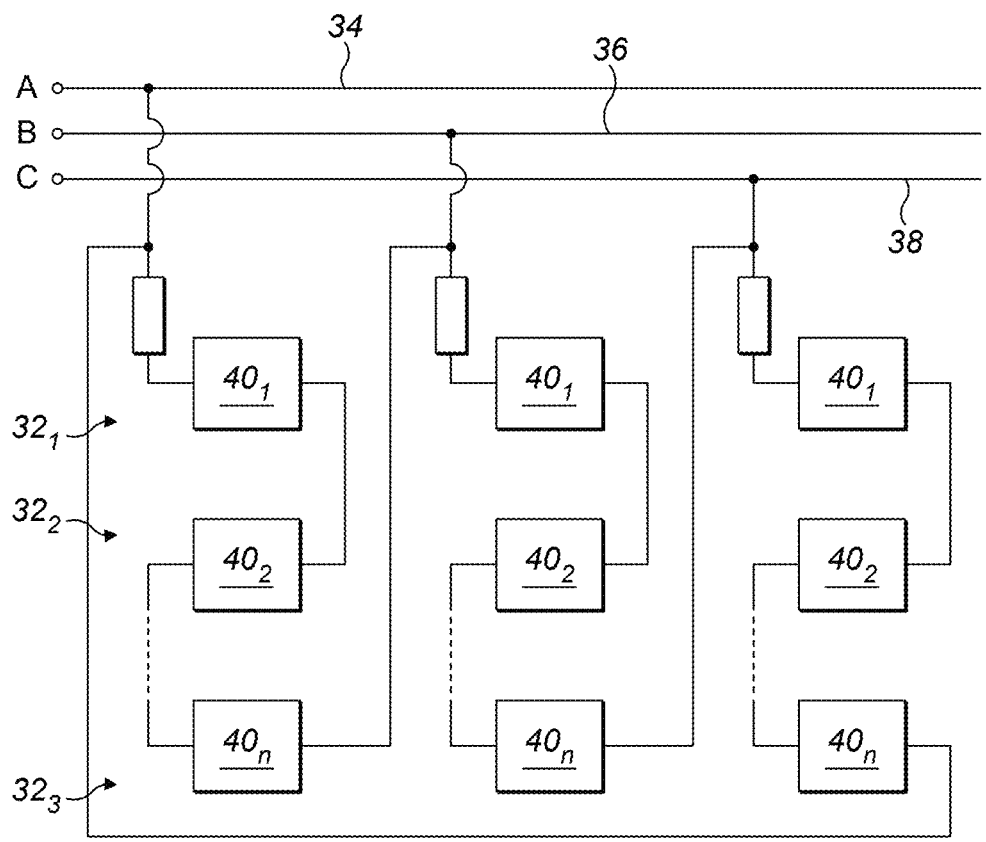

FIGS. 3 and 4 show a power converter implemented as a STATCOM.

Each power converter includes three converter arms $32_1$, $32_2$ and $32_3$. The first converter arm $32_1$ is connected to a first AC bus 34 at a first end. The second converter arm $32_2$ is connected to a second AC bus 36 at a first end. The third converter arm $32_3$ is connected to a third AC bus 38 at a first end.

In the power converter shown in FIG. 3, the first, second and third converter arms $32_1$, $32_2$ and $32_3$ are connected together in a star configuration at their second ends. In the power converter shown in FIG. 4, the first, second and third converter arms $32_1$, $32_2$ and $32_3$ are connected together in a delta configuration at this second ends.

Each converter arm $32_1$, $32_2$ and $32_3$ includes n series-connected converter units (or submodules) 401, 402, ..., $40_n$, where n is any suitable integer. Each converter arm includes an inductor.

By operating the converter units 402, ..., $40_n$ the power converter can act as a source or sink of reactive AC power for regulating an AC transmission network, for example.

Figure 5:
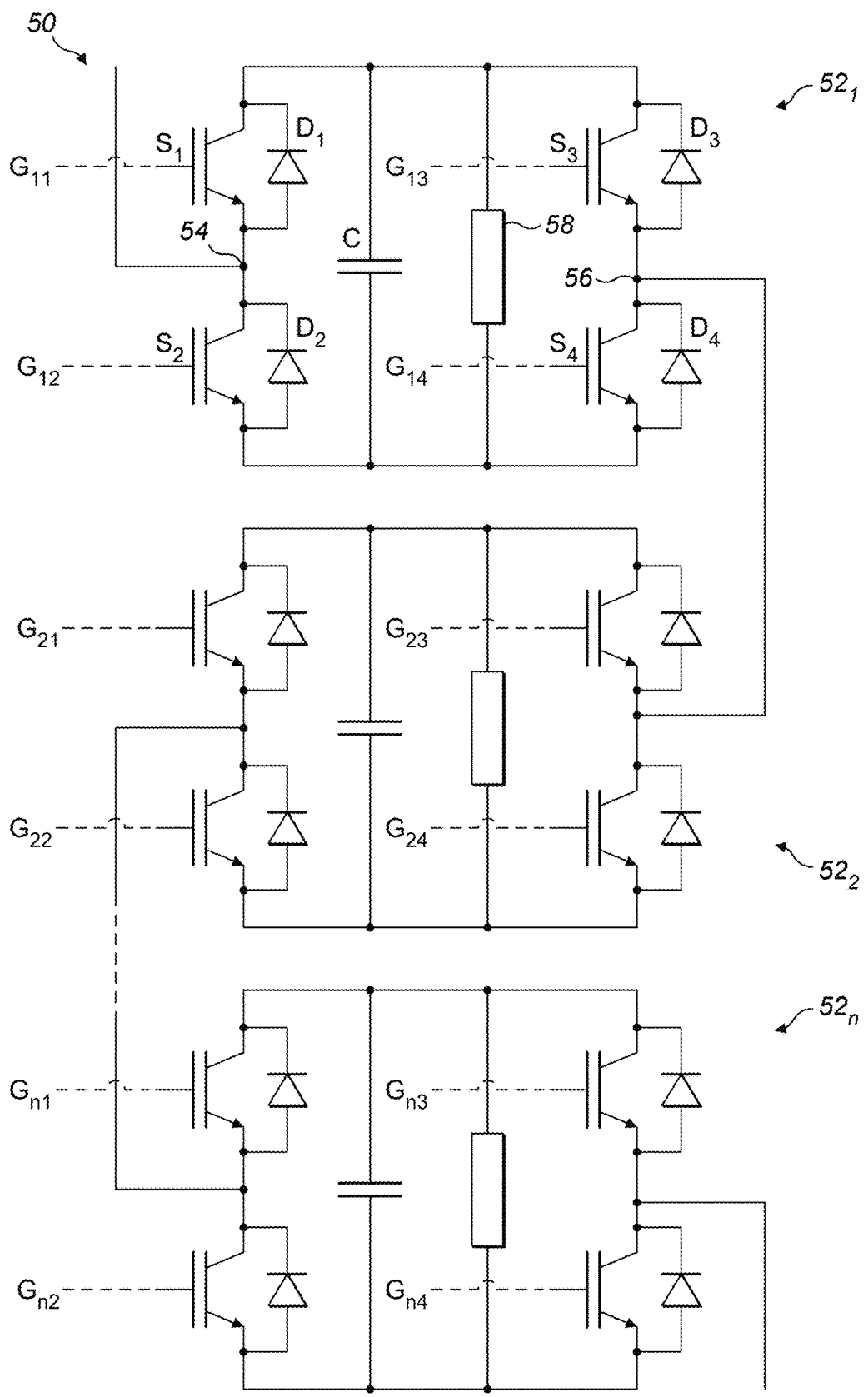
FIG. 5 shows a first converter arm for a power converter according to the present disclosure implemented as a MMC with a plurality of series-connected submodules.

FIG. 5 shows a generic first converter arm 50 that can be utilized in any of the power converters shown in FIGS. 1 to 4 when implemented as a MMC. The converter arm 50 includes n series-connected submodules $52_1$, $52_2$, ..., $52_n$, where n is any suitable integer.

Each submodule $52_1$, $52_2$, ..., $52_n$ is shown as having a full-bridge topology. But it will be readily understood that other suitable topologies can also be used. In the full-bridge topology, each submodule comprises a first leg with two controllable semiconductor switches $S_1$ and $S_2$ connected in series and a second leg with two controllable semiconductor switches $S_3$ and $S_4$ connected in series. Each semiconductor switch is shown as an IGBT with an anti-parallel connected diode $D_1, D_2, \ldots, D_4$, but it will be readily understood that other controllable semiconductor switches can be used.

The first and second arms are connected in parallel. An energy storage device (e.g., a capacitor C) is connected in parallel with both the first and second legs. The semiconductor switches $S_1, S_2, \ldots, S_4$ of each submodule $52_1, 52_2, \ldots, 52_n$ are controlled by respective gate drive commands $G_{11}, G_{12}, G_{13}, G_{14}, G_{21}, G_{22}, \ldots, G_{n4}$ as shown to be switched between an on-state and an off-state (i.e., turned on and off) to selectively charge, discharge or bypass the capacitor C.

A junction of the semiconductor switches $S_1$ and $S_2$ in the first leg defines a first AC terminal 54 and a junction of the semiconductor switches $S_3$ and $S_4$ in the second leg defines a second AC terminal 56.

The first AC terminal 54 of the submodule $52_1$ (i.e., the submodule at a first end of the converter arm 50) is connected to an AC bus or a DC bus as shown in FIGS. 1 to 4. The second AC terminal of the nth submodule $52_n$ (i.e., the submodule at a second end of the converter arm 50) is connected to an AC bus or a DC bus—as shown in FIGS. 1 and 2—or to another converter arm of the MMC as shown in FIGS. 3 and 4.

For all other submodules $52_1, 52_2, \ldots, 52_{(n-1)}$, the second AC terminal is connected to the first AC terminal of the next submodule in the converter arm. That is, the second AC terminal 56 of the first submodule $52_1$ is connected to the first AC terminal of the second submodule $52_2$, the second AC terminal of the second submodule $52_2$ is connected to the first AC terminal of the third submodule, and so on, until the nth submodule $52_n$.

Each submodule $52_1, 52_2, \ldots, 52_n$ includes a voltage sensor 58 which provides a respective voltage feedback signal.

Figure 6:
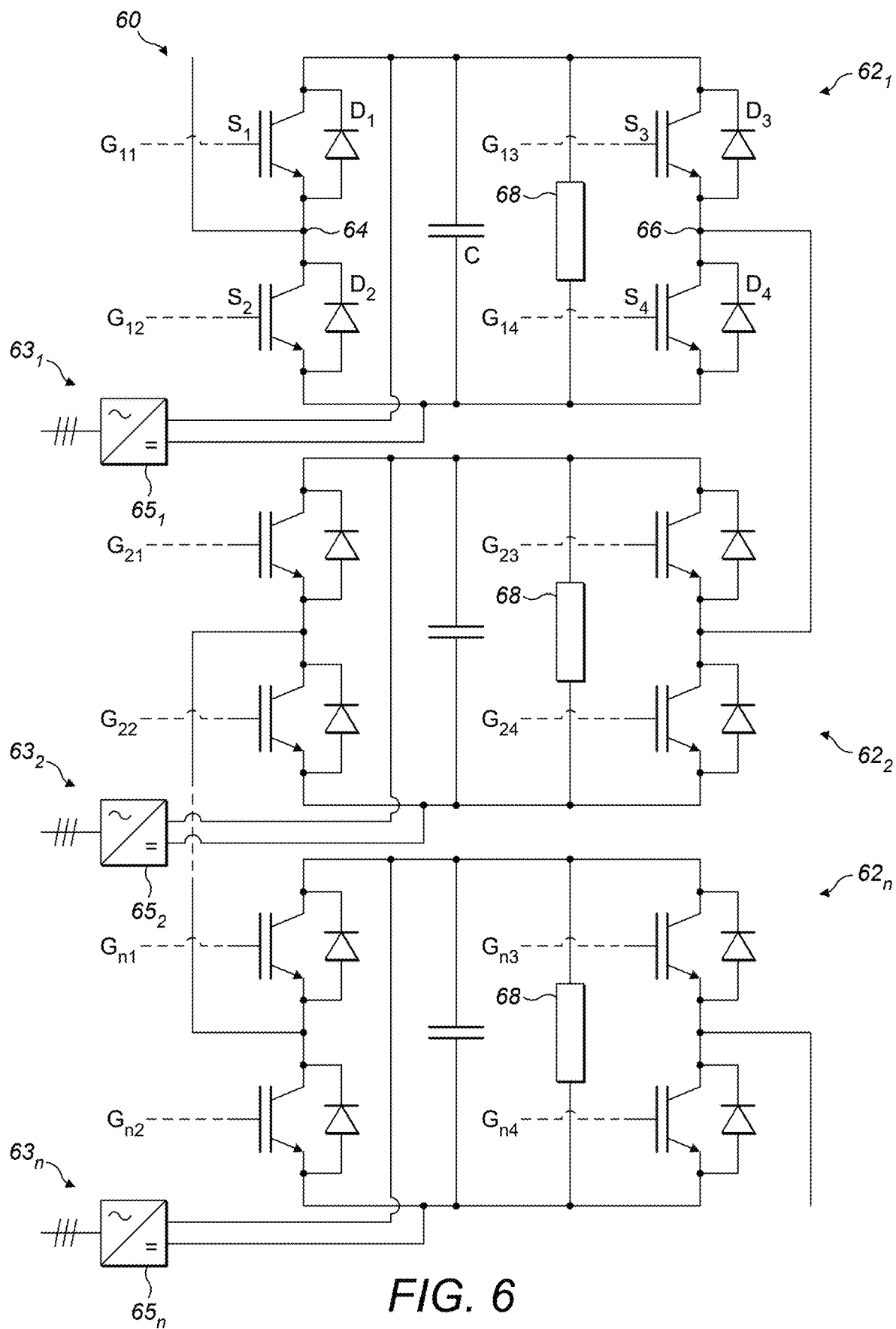
FIG. 6 shows a second converter arm for a power converter according to the present disclosure with a plurality of series-connected VSCs.

FIG. 6 shows a generic second converter arm 60 that can be utilized in any of the power converters shown in FIGS. 1 to 4. The converter arm 60 includes n series-connected converter units $62_1, 62_2, \ldots, 62_n$, where n is any suitable integer, which are implemented as individual VSCs.

Each converter unit $62_1, 62_2, \ldots, 62_n$ is shown as having a two-level topology with two output voltage levels. But it will be readily understood that other suitable topologies can also be used, including multi-level topologies that will provide three or more output voltage levels. In the two-level topology, each converter unit comprises a first leg with two controllable semiconductor switches $S_1$ and $S_2$ connected in series and a second leg with two controllable semiconductor switches $S_3$ and $S_4$ connected in series.

Each semiconductor switch is shown as an IGBT with an anti-parallel connected diode $D_1, D_2, \ldots, D_4$, but it will be readily understood that other controllable semiconductor switches can be used. The semiconductor switches $S_1, S_2, \ldots, S_4$ of each converter unit $62_1, 62_2, \ldots, 62_n$ are controlled by respective gate drive commands $G_{11}, G_{12}, G_{13}, G_{14}, G_{21}, G_{22}, \ldots, G_{n4}$ as shown to be switched between an on-state and an off-state (i.e., turned on and off).

The first and second legs are connected in parallel. A junction of the semiconductor switches $S_1$ and $S_2$ in the first leg defines a first AC terminal 64 and a junction of the semiconductor switches $S_3$ and $S_4$ in the second leg defines a second AC terminal 66.

An energy storage device (e.g., a capacitor C) is connected in parallel with both the first and second legs. The energy storage device of each converter unit $62_1, 62_2, \ldots, 62_n$ is charged by a separate power supply infeed $63_1, 63_2, \ldots, 63_n$. Each power supply infeed includes a power converter $65_1, 65_2, \ldots, 65_n$ (e.g., a passive rectifier such as a diode bridge or an active rectifier such as a two-level or multi-level converter). The DC terminals of each power converter $65_1, 65_2, \ldots, 65_n$ are connected to first and second DC rails of the respective converter unit as shown in FIG. 6.

The first AC terminal 64 of the converter unit $62_1$ (i.e., the converter unit at a first end of the converter arm 60) is connected to an AC bus or a DC bus as shown in FIGS. 1 to 4. The second AC terminal of the nth converter unit $62_n$ (i.e., the converter unit at a second end of the converter arm 60) is connected to an AC bus or a DC bus—as shown in FIGS. 1 and 2—or to another converter arm as shown in FIGS. 3 and 4.

For all other converter units $62_1, 62_2, \ldots, 62_{(n-1)}$, the second AC terminal is connected to the first AC terminal of the next converter unit in the converter arm. That is, the second AC terminal 56 of the first converter unit $62_1$ is connected to the first AC terminal of the second converter unit $62_2$, the second AC terminal of the second converter unit $62_2$ is connected to the first AC terminal of the third converter unit, and so on, until the nth converter unit $62_n$.

Each converter unit $62_1, 62_2, \ldots, 62_n$ includes a voltage sensor 68 which provides a respective voltage feedback signal.

Figure 7:
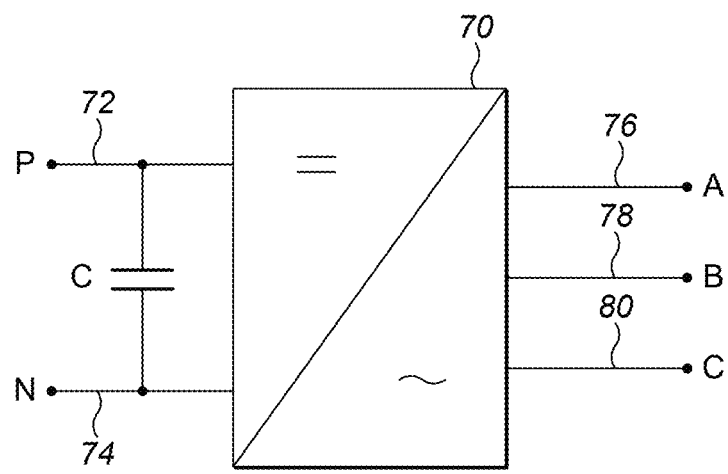
FIGS. 7 and 8 show a power converter according to the present disclosure implemented as a VSC.
Figure 8:
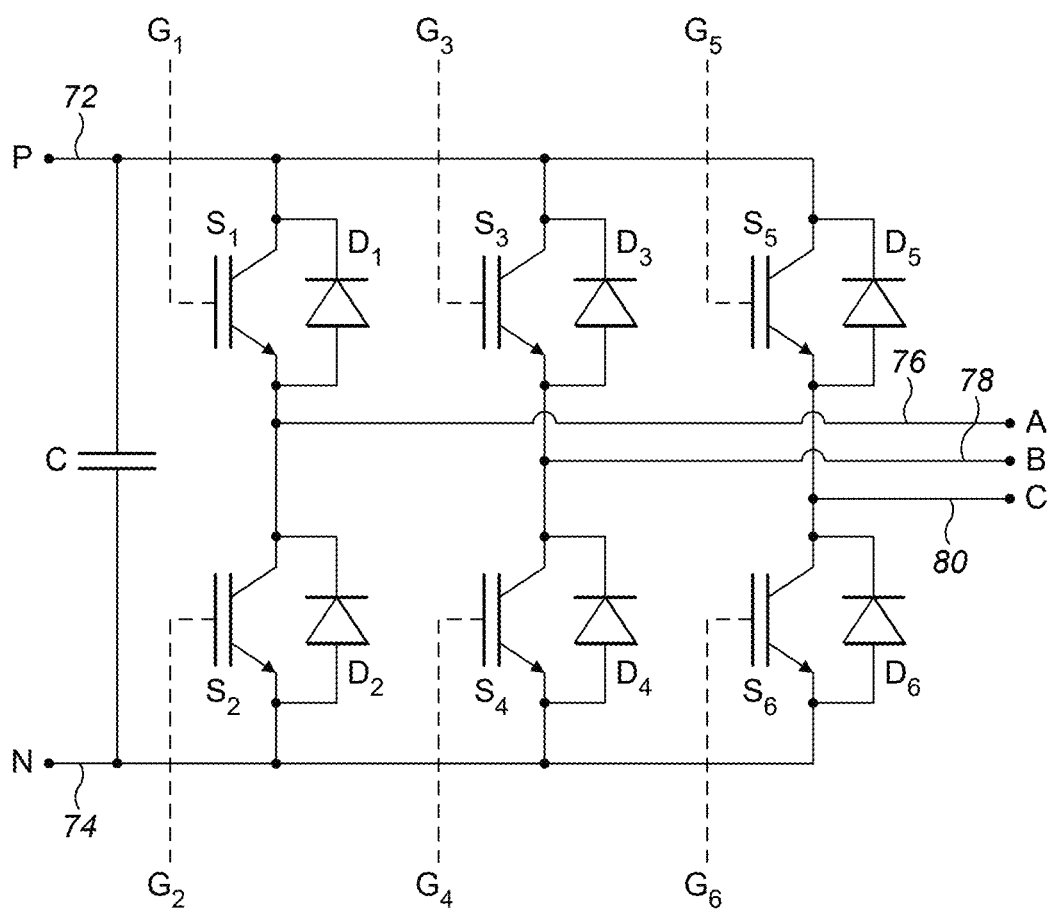

FIGS. 7 and 8 show a power converter implemented as a VSC.

The power converter includes a converter unit 70 that can convert a DC input voltage to an AC output voltage or vice versa.

The converter unit 70 can have any suitable topology. As shown in FIG. 8, the converter unit 70 has a two-level topology and includes a first leg with two controllable semiconductor switches $S_1$ and $S_2$ connected in series, a second leg with two controllable semiconductor switches $S_3$ and $S_4$ connected in series, and a third leg with two controllable semiconductor switches $S_5$ and $S_6$ connected in series. Each semiconductor switch is shown as an IGBT with an anti-parallel connected diode $D_1, D_2, \ldots, D_6$, but it will be readily understood that other controllable semiconductor switches can be used.

The first, second and third arms are connected in parallel between first and second DC buses 72 and 74. An energy storage device (e.g., a capacitor C) is connected in parallel with both the first, second and third legs. The semiconductor switches $S_1, S_2, \ldots, S_6$ of the converter unit 70 are controlled by respective gate drive commands $G_1, G_2, \ldots, G_6$ as shown to be switched between an on-state and an off-state, i.e., turned on and off.

A junction of the semiconductor switches $S_1$ and $S_2$ in the first leg defines a first AC bus 76. A junction of the semiconductor switches $S_3$ and $S_4$ in the second leg defines a second AC bus 78. A junction of the semiconductor switches $S_5$ and $S_6$ in the third leg defines a third AC bus 80.

The first, second and third AC buses 76, 78 and 80 can be connected to a three-phase AC load or a three-phase AC supply such as an electric machine or a utility grid (not shown).

The first and second DC buses 72, 74 can be connected to a second converter unit (not shown).

Figure 9:
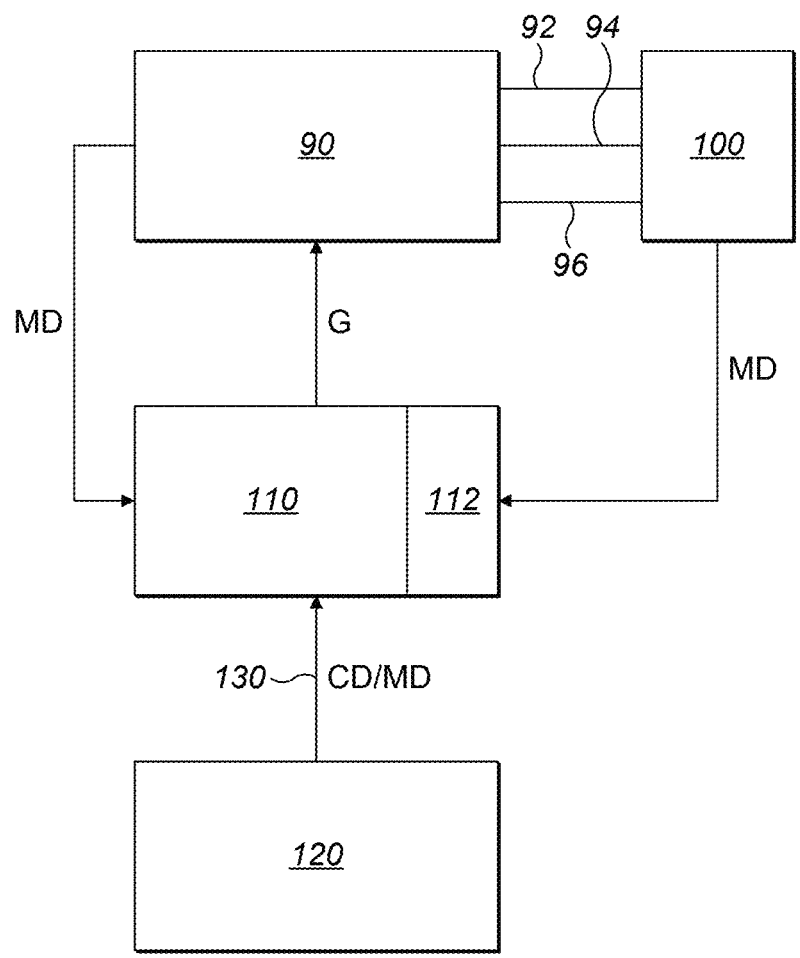
FIG. 9 shows a power converter system according to the present disclosure.

FIG. 9 shows a power converter system with a power converter 90 that can be implemented as any of the power converters shown in FIGS. 1 to 6 (i.e., with a plurality of series-connected converter units (or submodules)) or as the power converter shown in FIGS. 7 and 8. The power converter 90 includes first, second and third AC buses 92, 94 and 96 that are connected to a three-phase AC load 100, e.g., an electric machine or a utility grid.

The converter units of the power converter 90 are controlled by a local controller 110. If implemented with a plurality of series-connected converter units (or submodules) the local controller 110 can be used to control two or more associated converter units that are controlled together as a group. The power converter system can comprise a plurality of local controllers, each local controller being associated with at least one converter unit.

As described in more detail below, the local controller 110 also receives measurement data.

The local controller 110 can be implemented as a programmable logic device (e.g., a CPLD or FPGA that are semiconductor devices that are based around a matrix of configurable logic blocks). The programmable logic device can support parallel processing to facilitate calculation, sending and receiving of data and the sending of gate drive commands to control the switching of the semiconductor switches of each associated converter unit as parallel processes. Each local controller can also be implemented as DSPs or as micro or multicore processing units, for example.

The local controller 110 receives control data from a main controller 120. As described in more detail below, the local controller 110 also receives measurement data.

The local controller 110 can be implemented as a programmable logic device (e.g., a CPLD or FPGA that are semiconductor devices that are based around a matrix of configurable logic blocks). The programmable logic device can support parallel processing to facilitate calculation, sending and receiving of data and the sending of gate drive commands to control the switching of the semiconductor switches of each associated converter unit as parallel processes. Each local controller can also be implemented as DSPs or as micro or multicore processing units, for example.

The local controller 110 can be implemented as a control device such as a distribution panel or a device with minimal protection and/or measurement functions.

The local controller 110 includes a suitable memory or storage device 112, e.g., SRAM. The local controller 110 is connected to the main controller 120 by a suitable signal connection 130 (or "communication link") which allows the local controller to receive control data ("CD") as one or more signals. The signal connection 130 can also allow other data or information to be transferred between the local controller 110 and the main controller 120. Any data can be transmitted between the main controller 120 and the local controller 110 using a suitable protocol, e.g., an ethernet-based protocol operating within the control cycle of the main controller.

The signal connection 130 can be a fiber optic cable, an electrical (or wired) connection, or a wireless connection using any suitable wireless protocol, for example. The signal connection 130 can include two or more fiber optic cables or electrical connections in parallel for redundancy.

During a normal operating condition of the power converter system, the local controller 110 will operate in a conventional manner and generate or derive gate drive commands G to control the semiconductor switches of each associated converter unit.

As explained in more detail above, the gate drive commands G are generated or derived by the local controller 110 using the control data CD that is provided by the main controller 120. In particular, the series of discrete values of the control data CD can be used directly by the local controller 110 to generate or derive the gate drive commands G or can be used to derive or calculate other values, which are used, in turn, to generate the gate drive commands G. Measurement data MD can also be provided to the local controller 110 by the main controller 120 or directly from one or more sensors, e.g., current or voltage sensors of the power converter 90 or the load 100. In some arrangements, the measurement data MD is also used by the local controller 110 to generate or derive the gate drive commands G.

During normal operation of the power converter system, the generated gate drive commands G will control each associated converter unit to achieve desired electrical parameter values based on the overall operating requirements. But during a fault condition, the local controller 110 can determine an operating state of the power converter 90 using at least one locally-stored value and will control the power converter according to a fault operating procedure that is selected based on the determined operating state as described in more detail below for specific examples. This control may be carried out by generating gate drive commands G for each associated converter unit.

During a fault condition of the power converter system, each converter unit of the power converter 90 will normally be controlled exclusively by the associated local controller 110. For example, the local controller 110 will generate or derive appropriate gate drive commands G without the need for any control data CD to be provided by the main controller 120.

In a first example, the load 100 is a utility grid or other power network. The power converter 90 is configured as an MMC as shown in FIG. 1 with a plurality of converter arms, each converter arm including a plurality of series-connected submodules. One or more submodules of one of the converter arms are controlled by a local controller 110. The power converter system includes a current sensor providing a current feedback signal indicative of the converter arm current, i.e., the current flowing in the converter arm. The current feedback signal is provided to the local controller 110 as measurement data.

The local controller 110 receives voltage feedback signals from the associated submodules as measurement data. Each voltage feedback signal is provided by a voltage sensor, e.g., voltage sensor 58 shown in FIG. 5.

The local controller 110 receives control data and measurement data from the main controller 120 through the signal connection 130. The main controller 120 can be used to control multiple converter arms of the power converter 90. The data transmitted by the main controller 120 includes: modulation data for the converter arm voltage, a signal for voltage balancing control, e.g., a voltage reference signal which might be a signal indicative of the average voltage of the converter arm (i.e., a "global" average voltage signal), a signal indicative of global CPU time for synchronization, phase angle information for the utility grid, and a signal indicative of the operating state of the power converter (i.e., "status data").

The status data can include the reactive power level and voltage magnitude of the power converter 90, which is indicative of a particular operating state. From the reactive power level and the voltage magnitude it is possible to derive the actual converter current and phase shift between the current and voltage (e.g., supplying capacitive or inductive reactive power). Knowing the coupling inductance from the power converter to the utility grid (e.g., from interface transformers, phase reactors and/or arm reactors) which can be stored as a parameter it is possible to control modulation demand or current according to the fault operating procedure. Additional converter-related parameters such as stored energy or capacitances and specific control loop parameters such as proportional or integral gains can be stored for the purpose of specific controls in conjunction with the fault operating procedure.

The control cycle time for the main controller 120 is about 100 μs.

Data from the main controller 120 is locally stored in the memory 112 of the local controller 110 every 1 ms. Data is stored in a FIFO buffer which can store a predetermined number of values obtained at different times. Data is transmitted from the main controller 120 to the local controller 110 using an ethernet-based protocol, which may be specific in terms of the order and the amount of data being transmitted. For example, each value may be transmitted and stored in the memory 112 of the local controller 110 as a 16-bit data file (2 byte). Values of the current and voltage feedback signals can be transmitted and stored in the memory 112 of the local controller 110 in the same way.

If the power converter 90 is supplying reactive power and a communication fault is detected in the signal connection 130, the local controller 110 will use the locally-stored status data to determine the operating state of the power converter immediately prior to the fault. For example, the operating status can be determined by analyzing one or more of the locally-stored values of reactive power (or current) and/or voltage magnitude.

Considering ten consecutive locally-stored values, the local controller can determine if there is a rate of change— e.g., if the values are increasing (ramp-up) or decreasing (ramp-down). If all ten consecutive locally-stored values are substantially constant, the local controller can determine that the power converter is in a steady state, for example at no load or full load in terms of power or current level. Rate of change can be determined for output frequency and output voltage as well (e.g., for variable speed drives).

Once the operating state has been determined, the local controller will select an appropriate fault operating procedure. For example, if it is determined that the operating state of the power converter is a steady state, because the rate of change of locally-stored values is below a threshold, the appropriate fault operating procedure might be that the power converter is maintained in the same operating state at the same reactive power level for a period of time before being tripped, or that the reactive power level is ramped down and the power converter is turned off. When ramping down the power converter, the modulation demand can be adapted to reduce the current before the power converter is turned off.

In this first example, the selected fault operating procedure is designed to maintain the same operating state of the power converter 90 for 0.5 ms to see if communication with the main controller 120 can be re-established. After 0.5 ms, if communication has not been re-established, the power converter 90 will be tripped.

The local controller 110 will verify the locally-stored data and start to generate virtual phase angle information for the utility grid based on the locally-stored phase angle information for fixed frequency (i.e., grid frequency). In particular, the latest phase angle information stored in the memory 112 is used to replicate a rotating phase angle of the utility grid based on the global CPU time and the local controller time. The local controller 110 will generate gate drive commands for each associated submodule using PWM based on the locally-stored modulation data. Voltage balancing control uses the "global" average voltage signal and the voltage feedback signals from the associated submodules.

The current feedback signals are used to verify that the converter arm current remains in a required range (according to power level and stored operation state) otherwise the locally-derived modulation signal that is used to generate the gate drive commands will be increased or decreased by the local controller 110 to stay within the required range.

If communication with the main controller 120 is re-established, the main controller 120 will immediately take over control and provide control data to the local controller 110. Otherwise, the power converter 90 will be tripped after 0.5 ms.

In a second example, where the fault is in the main controller 120, fault information can be sent to the local controller 110 using a suitable protocol. In this second example, the selected fault operating procedure is designed to keep the power converter 90 connected to the utility grid 100 at no-load until a second main controller (not shown) can be brought on-line. The local controller 110 will generate gate drive commands for each associated submodule using PWM with a modulation signal that generates minimum current and that operates in phase with the utility voltage. It can take 20-100 ms for the second main controller (not shown) to come on-line and take over control of the local controller 110. During this period, it is advantageous to provide separate phase angle information to the local controller 110 using a separate signal connection.

If there is a generic fault in the converter arm, the local controller 110 can generate gate drive commands as pre-defined pulse sequences which can be selected with reference to the determined operating state. In a third example, if one submodule of the converter arm fails and is deactivated, the local controller 110 can re-balance the modulation for the remaining submodules. Gate drive commands can be generated according to an increasing modulation signal in order to compensate for the deactivated submodule. (In particular, if the converter arm includes ten series-connected submodules, and one submodule fails, the modulation for the remaining nine submodules needs to increase by about 11% to provide sufficient compensation.)

In a fourth example, the load 100 is an electric machine such as a motor or generator. The local controller 110 receives control data and measurement data from the main controller 120 through the signal connection 130. The data transmitted by the main controller 120 includes: rate of change of rotational speed (or frequency) and modulation data (or voltage) of the electric machine, and actual values of modulation data (or voltage), rotational speed (or frequency), torque (or current) and phase angle (power factor) of the electric machine.

Data is transmitted from the main controller 120 to the local controller 110 using an ethernet-based protocol, which may be specific in terms of the order and the amount of data being transmitted. For example, each value may be transmitted and stored in the memory 112 of the local controller 110 as a 16-bit data file (2 byte).

If a communication fault is detected in the signal connection 130, the local controller 110 will use the locally-stored data to determine the operating state immediately prior to the fault. Once the operating state has been determined, the local controller 110 will select an appropriate fault operating procedure.

In this fourth example, the selected fault operating procedure is designed to maintain the same operating state of the power converter 90 for 0.5 ms to see if communication with the main controller 120 can be re-established. After 0.5 ms, if communication has not been re-established, the power converter 90 will be tripped.

The local controller 110 will verify the locally-stored data and start to generate gate drive commands for each associated submodule using PWM based on the locally-stored modulation data. Phase data is locally generated for the electric machine based on locally-stored and measured current values and phase angle (or power factor).

If communication with the main controller 120 is re-established, the main controller 120 will immediately take over the control of the local controller 110. Otherwise, the power converter 90 will be tripped after 0.5 ms.

In a fifth example, where there is a fault in the main controller 120, the power converter 90 should be stopped as quickly as possible. The local controller 110 can generate gate drive commands as predefined pulse sequences which can be selected with reference to the determined operating state. The predefined pulse sequences are aligned with the previous operating state and are designed to stop the power converter 90 for a predefined rate of change of modulation and current reference. This can be done using a look-up table where the determined operating state (e.g., ramp-up state) is used as a pointer. Once the second main controller (not shown) is on-line, the power converter system can be operated as normal.

In a sixth example, the detected fault is an overcurrent in the power converter 90, in particular in the converter arm that includes the plurality of series-connected submodules. The overcurrent threshold can be set by the main controller 120 and stored in the local controller 110 as locally-stored values. The overcurrent is determined in conjunction with an evaluation of the operating state of the power converter 90.

For this example, the operating state is a an FRT event initiated through a short circuit in the utility grid. The main controller 120 sends indicative information to the local controller 110. FRT events are likely to cause overcurrent within the power converter 90, which cannot trip and must continue to provide a specific current level to comply with grid code requirements. Accordingly, the local controller 110 will select a fault operating procedure that inserts one or more additional submodules into the converter arm in an opposing direction to lower the converter arm current for the case that the overcurrent threshold is exceeded.

The local controller 110 selects submodules in a bypass state or zero state with the lowest or a low charge level (or DC voltage). The selected submodules are turned off to insert opposing voltage in the charging direction of the submodules. Submodules can be switched first to the bypass state or zero state-starting with the submodules with the highest DC voltages. The sum of the opposing voltages must increase to effectively limit the overcurrent as compared with normal operation.

The local controller 110 sequentially switches submodules into the converter arm-starting with the submodules with the lowest DC voltage-until the overcurrent is decreased below the overcurrent threshold. A cycle time of about 5-50 μs can be used. Once the overcurrent fault has been dealt with properly, the power converter 90 can be controlled by the main controller 120 using the control data supplied to the local controller 110.

A second overcurrent threshold can be defined by the main controller 120 that is lower than the first overcurrent threshold used to determine the overcurrent. The local controller 110 controls the current to be below the second overcurrent threshold that is 200 A lower than the first overcurrent threshold. Both overcurrent thresholds can have the same value but then it is more likely that the local controller enters more frequently into the current limiting operation. After the current falls below the second overcurrent threshold, the local controller 110 can end control of the submodules and the main controller 120 can revert to controlling power converter operation.

If the power converter 90 must operate with undervoltage at the grid side with the same power demand, the power converter must operate with a higher current. This operating state is indicated by an overload and sent to the local controller 110 that stores this information as a locally-stored value. For the case that the local controller 110 detects an overcurrent by exceeding the overcurrent threshold, the power converter 90 is operated as described above for FRT.

For the case that the power converter 90 is operating normally and the local controller 110 detects that the overcurrent threshold is exceeded, the local controller selects a fault operating procedure to minimize or reduce the fault current in the best way possible and to switch off the power converter (i.e., an emergency operating procedure). This procedure assumes that an overcurrent during normal operation occurs as a result of a short circuit within the power converter system.

The individual submodules can be turned off in sequence with a fixed delay time of about 5 μs to control the dv/dt. The sequence considers submodules in a bypass state or zero state with the lowest charge level (or lowest DC voltage) first. If the dv/dt during the turn-off of single submodules is moderate, groups of two, three or more submodules can be switched off at the same time in sequence with a fixed delay time. The sequence with fixed delay times further prevents a high overvoltage spike that would occur if all of the submodules are turned off at the same time.

Figure 10:
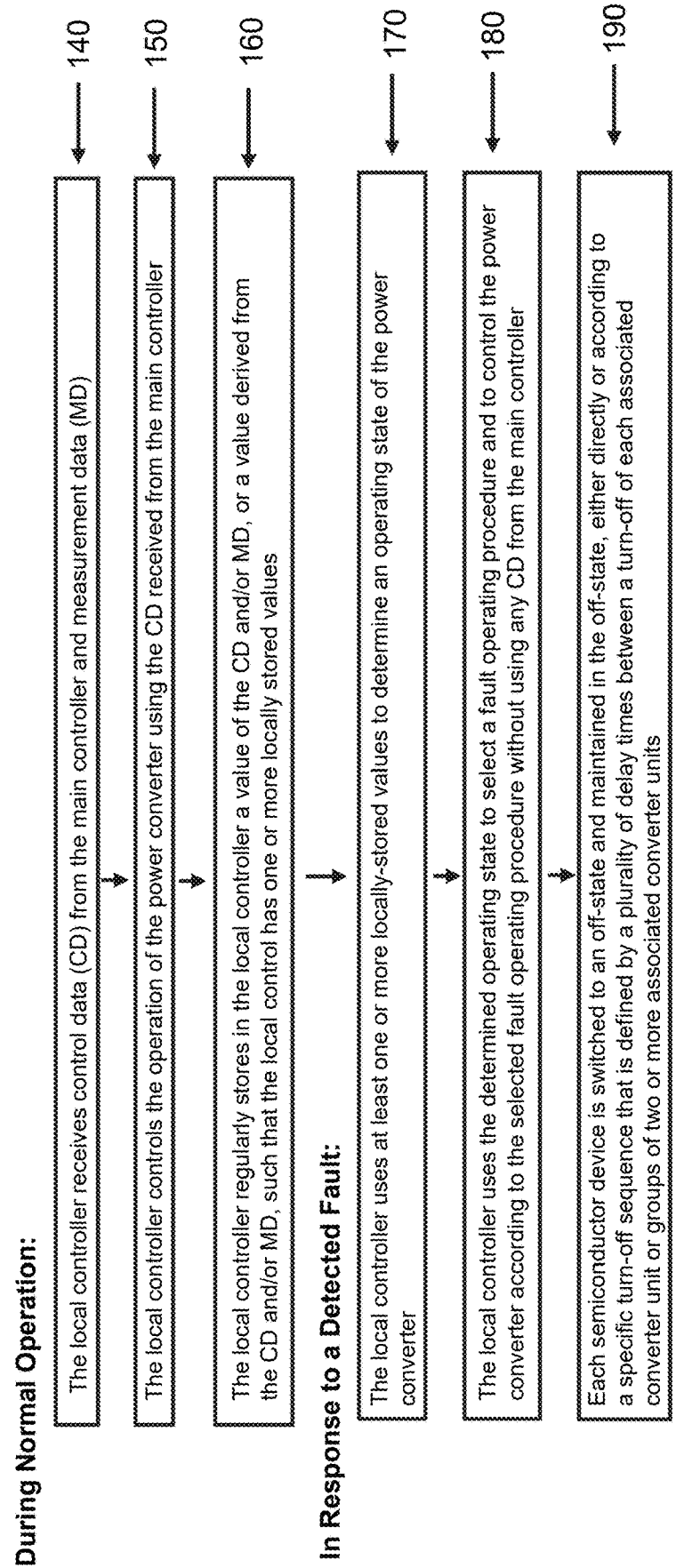
FIG. 10 shows an exemplary embodiment of a method for fault current reduction in a power converter system according to the present disclosure.

FIG. 10 shows an exemplary embodiment of a method for fault current reduction in a power converter system according to the present disclosure.

The method begins at step 140 in which during a normal operation of the power converter system, the local controller receives control data from the main controller and measurement data.

At step 150, the local controller controls the operation of the power converter using the CD received from the main controller.

At step 160, the local controller regularly stores in the local controller a value of the CD and/or MD or a value derived from the CD and/or MD such that the local control has one or more locally stored values.

Once a fault has been detected, the local controller uses at least one or more locally-stored values to determine an operating state of the power converter, as shown at step 170.

Finally, at step 180, the local controller uses the determined operating state to select a fault operating procedure and to control the power converter according to the selected fault operating procedure without using any CD from the main controller.

The method above further includes a step 190 in which the controllable semiconductor switch of each semiconductor device of the plurality of semiconductor devices is switched to an off-state and maintained in the off-state, either directly or according to a specific turn-off sequence that is defined by a plurality of delay times between a turn-off of each associated converter unit or groups of two or more associated converter units.

In the method above, the measurement data is provided as one or more signals and is one or more of DC voltage measurements; AC input or output voltage measurements; AC input or output current measurements; converter arm current measurements; frequency measurements; phase shift measurements; rotational speed measurements for an electric machine connected to the power converter; and temperature measurements indicative of the temperature of one or more semiconductor devices or other component of the power converter system.

In the method above, the control data can also be provided as one or more signals and includes one or more of: switching data for controlling the switching of the semiconductor switches of each associated converter unit; modulation data for generating gate drive commands; reference data for controlling an electrical parameter of the power converter or each associated converter unit and optionally used by the local controller to derive modulation data for generating gate drive commands; switching state of each associated converter unit; and status data indicative of the operating state of the power converter or each associated converter unit.

The one or more locally-stored values are stored in a buffer during the normal operating condition of the power converter system, and the buffer optionally stores a plurality of values that are obtained at different times during the normal operating condition of the power converter system. Two or more of the locally-stored values are used by the local controller to determine the operating state of the power converter in response to a detected fault condition of the power converter system.

In some embodiments, the fault operating procedure is a procedure that turns off each associated converter unit safely, maintains the power converter or each associated converter unit in the determined operating state or switching state, or a procedure that transitions the power converter or each associated converter unit to a new operating state, and reduces or limits an overcurrent.

In some embodiments, the fault operating procedure is a shut-down procedure where each associated converter unit is placed in a specific converter switching state determined by the switching state of the semiconductor switches of each associated converter unit.

The fault operating procedure also maintains the power converter or each associated converter unit in the determined operating state for a predetermined period of time, or until control data is provided from a redundant main controller.

In some embodiments, the fault operating procedure is a ramp-down procedure where one or more electrical parameters of the power converter or each associated converter unit are reduced towards zero or a particular value that represents a new operating state, or a ramp-up procedure where one or more electrical parameters of the power converter or each associated converter unit are increased towards a particular value that represents a new operating state.

In some embodiments, the fault operating procedure is for reducing a detected overcurrent within a converter arm of the power converter comprising a plurality of converter units connected in series, where one or more converter units are inserted into the converter arm in a charging direction to reduce the converter arm current.

In some embodiments, the fault operating procedure is for reducing a detected overcurrent within a converter arm of the power converter comprising a plurality of converter units connected in series, where one or more converter units are sequentially inserted into the converter arm in charging direction by use of a local control cycle time of the local controller, which is preferably at least half as long as the control cycle time of the main controller.

In some embodiments, the fault operating procedure is for reducing a detected overcurrent within a converter arm of the power converter comprising a plurality of converter units connected in series, wherein the power converter system includes a current sensor associated with the local controller and wherein the overcurrent is directly controlled by the local controller independent of the main controller.

In some embodiments, the fault operating procedure is for reducing a detected overcurrent within a converter arm of the power converter comprising a plurality of converter units connected in series, where one or more converter units are turned off and the converter current is reduced below a threshold which is less than a threshold for detecting an overcurrent.

The invention claimed is:

1. A power converter system comprising:
a power converter comprising at least one converter unit, each converter unit comprising a plurality of semiconductor devices, each semiconductor device including at least one controllable semiconductor switch;
a main controller; and
a local controller associated with at least one converter unit and adapted to receive control data (CD) from the main controller and measurement data (MD) optionally from one or more sensors;
wherein the local controller is adapted to:
during a normal operating condition of the power converter system,
control the operation of the power converter using the CD received from the main controller, and
regularly store in the local controller a value of the CD and/or MD and/or a value derived from the CD and/or MD, such that the local controller has one or more locally-stored values; and
in response to a detected fault condition of the power converter system,
use at least one of the one or more locally-stored values to determine an operating state of the power converter, and
use the determined operating state to select a fault operating procedure to control the power converter according to the selected fault operating procedure without using any CD from the main controller; and
wherein the at least one semiconductor switch of each semiconductor device of the plurality of semiconductor devices is switched to an off-state and maintained in the off-state according to a specific turn-off sequence that is defined by a plurality of delay times between a turn-off of each associated converter unit or groups of two or more associated converter units.

2. The power converter system according to claim 1, wherein each at least one converter unit (i) is a voltage source converter, (ii) includes an energy storage device and (iii) is optionally connected to a separate power supply infeed.

3. A method of operating a power converter system comprising:
a power converter comprising at least one converter unit, each converter unit comprising a plurality of semiconductor devices, each semiconductor device including at least one controllable semiconductor switch;
a main controller; and
a local controller associated with at least one converter unit;
the method comprising:
during a normal operating condition of the power converter system,
the local controller receiving control data (CD) from the main controller and measurement data (MD);

the local controller controlling the operation of the power converter using the CD received from the main controller; and the local controller regularly storing in the local controller a value of the CD and/or MD and/or a value derived from the CD and/or MD, such that the local controller has one or more locally-stored values; and in response to a detected fault condition of the power converter system, the local controller using at least one of the one or more locally-stored values to determine an operating state of the power converter, and the local controller using the determined operating state to select a fault operating procedure and to control the power converter according to the selected fault operating procedure without using any CD from the main controller;

wherein during the selected fault operating procedure, the at least one controllable semiconductor switch of each semiconductor device of the plurality of semiconductor devices is switched to an off-state and maintained in the off-state, either directly or according to a specific turn-off sequence that is defined by a plurality of delay times between a turn-off of each associated converter unit or groups of two or more associated converter units.

4. The method according to claim 3, wherein the measurement data is provided as one or more signals and is one or more of: DC voltage measurements; AC input or output voltage measurements; AC input or output current measurements; converter arm current measurements; frequency measurements; phase shift measurements; rotational speed measurements for an electric machine connected to the power converter; and temperature measurements indicative of the temperature of one or more semiconductor devices or other component of the power converter system.

5. The method according to claim 4, wherein the control data is provided as one or more signals and includes one or more of: switching data for controlling the switching of the semiconductor switches of each associated converter unit; modulation data for generating gate drive commands; reference data for controlling an electrical parameter of the power converter or each associated converter unit and optionally used by the local controller to derive modulation data for generating gate drive commands; switching state of each associated converter unit; and status data indicative of the operating state of the power converter or each associated converter unit.

6. The method according to claim 5, wherein the one or more locally-stored values are stored in a buffer during the normal operating condition of the power converter system, and wherein the buffer stores a plurality of values that are obtained at different times during the normal operating condition of the power converter system and two or more of the locally-stored values are used by the local controller to determine the operating state of the power converter in response to a detected fault condition of the power converter system.

7. The method according to claim 6, wherein the fault operating procedure is a procedure that (i) turns off each associated converter unit safely, (ii) maintains the power converter or each associated converter unit in the determined operating state or switching state, or a procedure that (iii) transitions the power converter or each associated converter unit to a new operating state, and (iv) reduces or limits an overcurrent.

8. The method according to claim 7, wherein the fault operating procedure is a shut-down procedure where each associated converter unit is placed in a specific converter switching state determined by the switching state of the semiconductor switches of each associated converter unit.

9. The method according to claim 7, wherein the fault operating procedure maintains the power converter or each associated converter unit in the determined operating state for a predetermined period of time, or until control data is provided from a redundant main controller.

10. The method according to claim 7, wherein the fault operating procedure is a ramp-down procedure where one or more electrical parameters of the power converter or each associated converter unit are reduced towards zero or a particular value that represents a new operating state, or a ramp-up procedure where one or more electrical parameters of the power converter or each associated converter unit are increased towards a particular value that represents a new operating state.

11. The method according to claim 7, wherein the fault operating procedure is for reducing a detected overcurrent within a converter arm of the power converter comprising a plurality of converter units connected in series, where one or more converter units are inserted into the converter arm in a charging direction to reduce the converter arm current.

12. The method according to claim 7, wherein the fault operating procedure is for reducing a detected overcurrent within a converter arm of the power converter comprising a plurality of converter units connected in series, where one or more converter units are sequentially inserted into the converter arm in charging direction by use of a local control cycle time of the local controller, which is at least half as long as the control cycle time of the main controller.

13. The method according to claim 7, wherein the fault operating procedure is for reducing a detected overcurrent within a converter arm of the power converter comprising a plurality of converter units connected in series, wherein the power converter system includes a current sensor associated with the local controller and wherein the overcurrent is directly controlled by the local controller independent of the main controller.

14. The method according to claim 7, wherein the fault operating procedure is for reducing a detected overcurrent within a converter arm of the power converter comprising a plurality of converter units connected in series, where one or more converter units are turned off and the converter current is reduced below a threshold which is less than a threshold for detecting an overcurrent.

* * * * *